United States Patent
Xue et al.

(10) Patent No.: US 12,256,399 B2
(45) Date of Patent: Mar. 18, 2025

(54) IN-COVERAGE NETWORK CONTROLLED OFF-LOADING OVER AN UNLICENSED SIDELINK

(71) Applicant: QUALCOMM Incorporated, San Diego, CA (US)

(72) Inventors: Yisheng Xue, San Diego, CA (US); Jing Sun, San Diego, CA (US); Xiaoxia Zhang, San Diego, CA (US); Chih-Hao Liu, San Diego, CA (US); Ozcan Ozturk, San Diego, CA (US); Lik Hang Silas Fong, Bridgewater, NJ (US); Sony Akkarakaran, Poway, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 17/328,986

(22) Filed: May 24, 2021

(65) Prior Publication Data
US 2021/0400704 A1 Dec. 23, 2021

Related U.S. Application Data

(60) Provisional application No. 63/041,066, filed on Jun. 18, 2020.

(51) Int. Cl.
*H04W 72/00* (2023.01)
*H04L 1/00* (2006.01)
(Continued)

(52) U.S. Cl.
CPC .......... *H04W 72/23* (2023.01); *H04L 1/0061* (2013.01); *H04L 1/1819* (2013.01);
(Continued)

(58) Field of Classification Search
None
See application file for complete search history.

(56) References Cited

U.S. PATENT DOCUMENTS

2016/0037524 A1* 2/2016 Krzymien ........... H04L 27/2601
370/329
2017/0188391 A1* 6/2017 Rajagopal ......... H04W 28/0284
(Continued)

FOREIGN PATENT DOCUMENTS

CN 107431596 A 12/2017
WO WO-2019099469 A1 * 5/2019 ........... H04L 1/1614

OTHER PUBLICATIONS

Partial International Search Report—PCT/US2021/034048—ISA/EPO—Sep. 22, 2021.
(Continued)

*Primary Examiner* — Brandon M Renner
(74) *Attorney, Agent, or Firm* — Guang Y. Zhang; Seyfarth Shaw LLP

(57) ABSTRACT

A method performed by a first sidelink (SL) user equipment (UE) includes receiving a downlink control information (DCI) from a number of coupled DCIs. The DCI grants reception of a number of scheduled physical SL shared channels (PSSCHs) over an unlicensed SL carrier, and requests a hybrid automatic repeat request (HARQ) response for the scheduled PSSCHs. The method also includes receiving at least one of the PSSCHs from a second SL UE. The method further includes transmitting the HARQ response based on the at least one received PSSCH.

29 Claims, 19 Drawing Sheets

(51) Int. Cl.
  *H04L 1/1812* (2023.01)
  *H04W 72/0446* (2023.01)
  *H04W 72/21* (2023.01)
  *H04W 72/23* (2023.01)
  *H04W 74/0816* (2024.01)
  *H04W 92/18* (2009.01)

(52) U.S. Cl.
  CPC ....... *H04W 72/0446* (2013.01); *H04W 72/21* (2023.01); *H04W 74/0816* (2013.01); *H04W 92/18* (2013.01)

(56) References Cited

U.S. PATENT DOCUMENTS

| | | | | |
|---|---|---|---|---|
| 2017/0325216 A1* | 11/2017 | Nogami | ................ | H04L 5/0055 |
| 2018/0248659 A1* | 8/2018 | You | ....................... | H04L 1/1896 |
| 2019/0364492 A1 | 11/2019 | Azizi et al. | | |
| 2020/0029318 A1* | 1/2020 | Guo | ...................... | H04L 1/1822 |
| 2020/0112415 A1 | 4/2020 | Huang et al. | | |
| 2020/0127796 A1* | 4/2020 | Li | ......................... | H04L 1/1812 |
| 2020/0136760 A1* | 4/2020 | Hahn | ................... | H04W 72/04 |
| 2020/0259595 A1* | 8/2020 | Seok | ..................... | H04L 1/1867 |
| 2020/0383095 A1* | 12/2020 | Moon | ..................... | H04L 5/001 |
| 2021/0306117 A1* | 9/2021 | Salim | ...................... | H04L 5/001 |
| 2022/0053513 A1* | 2/2022 | Ryu | .................. | H04W 72/1263 |
| 2022/0103292 A1* | 3/2022 | Hwang | ................... | H04L 5/00 |
| 2022/0201741 A1* | 6/2022 | Yoshioka | .............. | H04W 72/02 |
| 2022/0272726 A1* | 8/2022 | Wang | .................... | H04L 5/0055 |
| 2022/0360374 A1* | 11/2022 | Yoshioka | .............. | H04L 5/0094 |
| 2022/0368503 A1* | 11/2022 | Sun | ....................... | H04L 1/1854 |

OTHER PUBLICATIONS

International Search Report and Written Opinion—PCT/US2021/034048—ISA/EPO—Nov. 12, 2021.

Kumar D., et al., "5G(NR)—Fundamentals DCI Format 0_0", Apr. 2020, 4 Pages.

* cited by examiner

IN-COVERAGE NETWORK CONTROLLED OFF-LOADING OVER AN UNLICENSED SIDELINK

CROSS-REFERENCE TO RELATED APPLICATION

The present application claims the benefit of U.S. Provisional Patent Application No. 63/041,066, filed on Jun. 18, 2020, and titled "IN-COVERAGE NETWORK CONTROLLED OFF-LOADING OVER AN UNLICENSED SIDELINK," the disclosure of which is expressly incorporated by reference in its entirety.

FIELD OF THE DISCLOSURE

Aspects of the present disclosure generally relate to wireless communications, and more particularly to techniques and apparatuses for new radio (NR) vehicle-to-everything (V2X) communication over an unlicensed sidelink.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunications standards to provide a common protocol that enables different wireless devices to communicate on a municipal, national, regional, and even global level. An example telecommunications standard is fifth generation (5G) new radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the fourth generation (4G) long term evolution (LTE) standard. There exists a need for further improvements in 5G NR technology. These improvements may also be applicable to other multi-access technologies and the telecommunications standards that employ these technologies.

Wireless communications systems may include or provide support for various types of communications systems, such as vehicle related communications systems (e.g., vehicle-to-everything (V2X) communications systems). Vehicle related communications systems may be used by vehicles to increase safety and to help prevent collisions of vehicles. Information regarding inclement weather, nearby accidents, road conditions, and/or other information may be conveyed to a driver via the vehicle related communications system. In some cases, sidelink user equipments (UEs), such as vehicles, may communicate directly with each other using device-to-device (D2D) communications over a D2D wireless link. These communications can be referred to as sidelink communications.

As the demands for sidelink communications increase, different V2X communications systems compete for the same wireless communications resources. Moreover, some sidelink UEs may be power limited. Accordingly, there is a need to improve the efficiency of sidelink wireless communications.

To meet the growing demands for expanded mobile broadband connectivity, wireless communications technologies are advancing from the long term evolution (LTE) technology to a next generation new radio (NR) technology, which may be referred to as 5th Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

SUMMARY

According to an aspect of the present disclosure, a method performed by a first sidelink (SL) user equipment (UE), receives downlink control information (DCI) from multiple coupled DCIs. The DCI grants reception of multiple scheduled physical SL shared channels (PSSCHs) over an unlicensed SL carrier. The DCI also requests a hybrid automatic repeat request (HARQ) response for multiple scheduled PSSCHs. The method also receives at least one of the multiple PSSCHs from a second SL UE. The method further transmits the HARQ response based on the at least one received PSSCH.

In another aspect of the present disclosure, a method performed by a first SL UE, receives DCI from multiple coupled DCIs. The DCI grants transmission of multiple physical SL shared channels (PSSCHs) over an unlicensed SL carrier. The DCI also configures a first listen-before-talk (LBT) for the multiple PSSCHs, and requests LBT feedback for the first LBT. The method also transmits at least one of the multiple PSSCHs to a second SL UE. The method further transmits the LBT feedback for the at least one PSSCH.

In another aspect of the present disclosure, a method performed by a base station transmits multiple coupled DCIs for transmitting multiple transport blocks (TBs) via an unlicensed SL carrier to at least a first SL UE and a second SL UE. The method further receives feedback from at least the first SL UE and the second SL UE based on the coupled DCIs.

In another aspect of the present disclosure, an apparatus for wireless communications at a UE includes a processor and memory coupled with the processor. Instructions stored in the memory are operable, when executed by the processor, to cause the apparatus to receive DCI from multiple coupled DCIs. The DCI grants reception of multiple scheduled PSSCHs over an unlicensed SL carrier. The DCI also requests a HARQ response for multiple scheduled PSSCHs. Execution of the instructions also cause the apparatus to receive at least one of the multiple PSSCHs from a second SL UE. Execution of the instructions further cause the apparatus to receive at transmit the HARQ response based on the at least one received PSSCH.

In another aspect of the present disclosure, an apparatus for wireless communications at a UE includes a processor and memory coupled with the processor. Instructions stored in the memory are operable, when executed by the processor, to cause the apparatus to receive DCI from multiple coupled DCIs. The DCI grants transmission of multiple PSSCHs over an unlicensed SL carrier. The DCI also configures a first LBT for the multiple PSSCHs, and requests LBT feedback for the first LBT. Execution of the instructions further cause the apparatus to transmit at least one of the multiple PSSCHs to a second SL UE. Execution of the instructions also cause the apparatus to transmit the LBT feedback for the at least one PSSCH.

In another aspect of the present disclosure, an apparatus for wireless communications at a base station includes a processor and memory coupled with the processor. Instructions stored in the memory are operable, when executed by the processor, to cause the apparatus to transmit multiple coupled DCIs for transmitting multiple TBs via an unlicensed SL carrier to at least a first SL UE and a second SL UE. Execution of the instructions further cause the apparatus to receive feedback from at least the first SL UE and the second SL UE based on the coupled DCIs.

In another aspect of the present disclosure, a UE for wireless communications includes means for receiving DCI from multiple coupled DCIs. The DCI includes means for granting reception of multiple scheduled PSSCHs over an unlicensed SL carrier. The DCI also requests a HARQ response for multiple scheduled PSSCHs. The UE includes means for receiving at least one of the multiple PSSCHs from a second SL UE. The UE further includes means for transmitting the HARQ response based on the at least one received PSSCH.

In another aspect of the present disclosure, a UE for wireless communications includes means for receiving first downlink control information (DCI) from multiple coupled DCIs. The DCI grants transmission of multiple PSSCHs over an unlicensed SL carrier. The DCI also configures a first LBT for the multiple PSSCHs, and requests LBT feedback for the first LBT. The UE also includes means for transmitting at least one of the multiple PSSCHs to a second SL UE. The UE further includes means for transmitting the LBT feedback for the at least one PSSCH.

In another aspect of the present disclosure, a base station for wireless communications includes means for transmitting multiple coupled DCIs for transmitting multiple TBs via an unlicensed SL carrier to at least a first SL UE and a second SL UE. The base station further includes means for receiving feedback from at least the first SL UE and the second SL UE based on the coupled DCIs.

In another aspect of the present disclosure, a non-transitory computer-readable medium with program code recorded thereon is disclosed. The program code is executed by a UE and includes program code to receive DCI from multiple coupled DCIs. The DCI grants reception of multiple scheduled PSSCHs over an unlicensed SL carrier. The DCI also requests a HARQ response for multiple scheduled PSSCHs. The UE also includes program code to receive at least one of the multiple PSSCHs from a second SL UE. The UE also includes program code to further transmit the HARQ response based on the at least one received PSSCH.

In another aspect of the present disclosure, a non-transitory computer-readable medium with program code recorded thereon is disclosed. The program code is executed by a UE and includes program code to receive first DCI from multiple coupled DCIs. The DCI grants transmission of multiple PSSCHs over an unlicensed SL carrier. The DCI also configures a first LBT for the multiple PSSCHs, and requests LBT feedback for the first LBT. The UE includes program code to transmit at least one of the multiple PSSCHs to a second SL UE. The UE further includes program code to transmit the LBT feedback for the at least one PSSCH.

In another aspect of the present disclosure, a non-transitory computer-readable medium with program code recorded thereon is disclosed. The program code is executed by a base station and includes program code to transmit multiple coupled DCIs for transmitting multiple TBs via an unlicensed SL carrier to at least a first SL UE and a second SL UE. The base station further includes program code to receive feedback from at least the first SL UE and the second SL UE based on the coupled DCIs.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
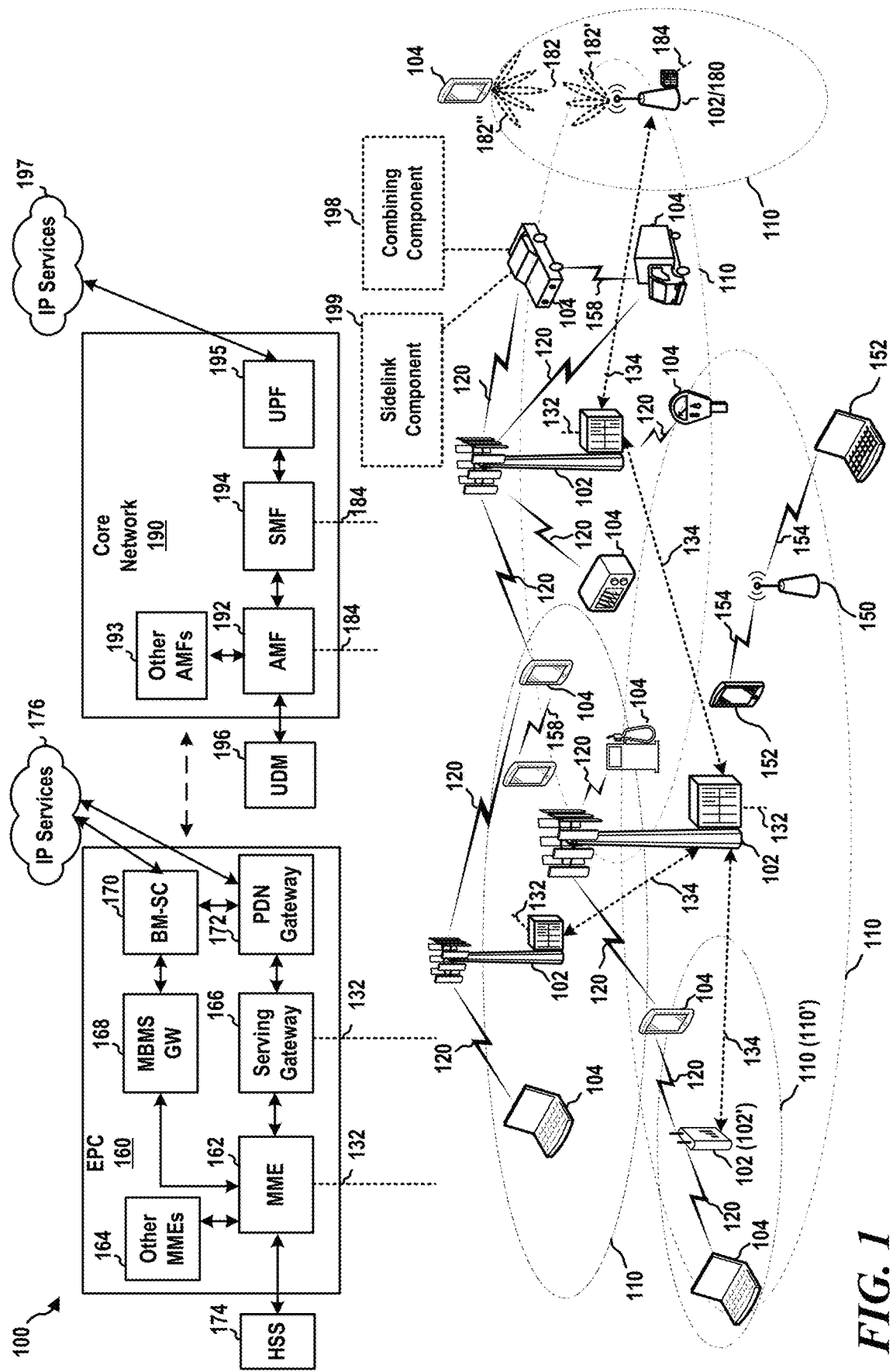
FIG. 1 is a diagram illustrating an example of a wireless communications system and an access network.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure disclosed, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

In cellular communications networks, wireless devices may generally communicate with each other via one or more network entities such as a base station or scheduling entity. Some networks may support device-to-device (D2D) communications that enable discovery of, and communications with nearby devices using a direct link between devices (e.g., without passing through a base station, relay, or another node). D2D communications can enable mesh networks and device-to-network relay functionality. Some examples of D2D technology include Bluetooth pairing, Wi-Fi Direct, Miracast, and LTE-D. D2D communications may also be referred to as point-to-point (P2P) or sidelink communications.

D2D communications may be implemented using licensed or unlicensed bands. Additionally, D2D communications can avoid the overhead involving the routing to and from the base station. Therefore, D2D communications can improve throughput, reduce latency, and/or increase energy efficiency.

A type of D2D communications may include vehicle-to-everything (V2X) communications. V2X communications may assist autonomous vehicles in communicating with each other. For example, autonomous vehicles may include multiple sensors (e.g., light detection and ranging (LiDAR), radar, cameras, etc.). In most cases, the autonomous vehicle's sensors are line of sight sensors. In contrast, V2X communications may allow autonomous vehicles to communicate with each other for non-line of sight situations.

Sidelink (SL) communications refers to the communications among user equipment (UEs) without tunneling through a base station (BS) and/or a core network. Sidelink communications can be communicated over a physical sidelink control channel (PSCCH) and a physical sidelink shared channel (PSSCH). The PSCCH and PSSCH are similar to a physical downlink control channel (PDCCH) and a physical downlink shared channel (PDSCH) in downlink (DL) communications between a BS and a UE. For instance, the PSCCH may carry sidelink control information (SCI) and the PSSCH may carry sidelink data (e.g., user data). Each PSCCH is associated with a corresponding PSSCH, where SCI in a PSCCH may carry reservation and/or scheduling information for sidelink data transmission in the associated PSSCH. Use cases for sidelink communications may include, among others, vehicle-to-everything (V2X), industrial IoT (IIoT), and/or NR-lite.

Some wireless systems, such as NR, support two modes of radio resource allocations (RRA)—a mode-1 RRA and a mode-2 RRA—for sidelink over a licensed spectrum. The mode-1 RRA supports network controlled RRA for in-coverage sidelink communications. For instance, a serving BS may determine a radio resource on behalf of a sidelink UE and transmit an indication of the radio resource to the sidelink UE. The mode-2 RRA supports autonomous RRA for out-of-coverage sidelink UEs or partial-coverage sidelink UEs. For instance, an out-of-coverage sidelink UE or a partial-coverage UE may be preconfigured with a sidelink resource pool and may select a radio resource from the preconfigured sidelink resource pool for sidelink communications.

The deployment of NR over an unlicensed spectrum is referred to as NR-unlicensed (NR-U). Some studies have been conducted for NR-U deployment over 5 gigahertz (GHz) unlicensed bands. Federal Communications Commission (FCC) and European Telecommunications Standards Institute (ETSI) are working on regulating 6 GHz as a new unlicensed band for wireless communications. The addition of 6 GHz bands allows for hundreds of megahertz (MHz) of bandwidth (BW) available for unlicensed band communications. Additionally, NR-U can also be deployed over 2.4 GHz unlicensed bands, which are currently shared by various radio access technologies (RATs), such as IEEE 802.11 wireless local area network (WLAN) or Wi-Fi and/or license assisted access (LAA). Sidelink can benefit from using the additional bandwidth available in an unlicensed spectrum.

The present disclosure describes systems and methods for sidelink (SL) communications in an unlicensed frequency band. In one implementation, a first SL user equipment (UE), receives downlink control information (DCI) from multiple coupled DCIs. The DCI may grant reception of multiple scheduled physical SL shared channels (PSSCHs) over an unlicensed SL carrier. In this implementation, the DCI also requests a hybrid automatic repeat request (HARQ) response for multiple scheduled PSSCHs. Additionally, in this implementation, the first SL UE also receives one or more of the multiple PSSCHs from a second SL UE. Furthermore, in this implementation, the first SL UE transmits the HARQ response based on the received PSSCH(s).

In another implementation, a first SL UE, receives DCI from multiple coupled DCIs. In this implementation, the DCI grants transmission of multiple PSSCHs over an unlicensed SL carrier. Additionally, in this implementation, the DCI configures a first listen-before-talk (LBT) for the multiple PSSCHs, and requests LBT feedback for the first LBT. In this implementation, the first SL UE transmits one or more PSSCHs of the multiple PSSCHs to a second SL UE. Furthermore, in this implementation, the first SL UE transmits the LBT feedback for the one or more PSSCHs.

In yet another implementation, a base station transmits multiple coupled DCIs for transmitting multiple transport blocks (TBs) via an unlicensed SL carrier to a first SL UE and a second SL UE. In this implementation, the base station receives feedback from the first SL UE and the second SL UE based on the coupled DCIs.

Aspects of the present disclosure improve UE and network performance corresponding to sidelink communications. Specifically, for sidelink communications, aspects of the present disclosure may improve data rates, improve capacity, improve spectral efficiency, and increase communication reliability. The present disclosure may also improve various sidelink use cases including, but not limited to, device-to-device (D2D) communications, vehicle-to-everything (V2X) communications, cellular vehicle-to-everything (C-V2X) communications, IIoT, NR-lite, enhanced mobile broadband (eMBB), ultra-reliable low latency communications (URLLC), and/or massive machine type communications (mMTC).

FIG. 1 is a diagram illustrating an example of a wireless communications system and an access network 100. The wireless communications system (also referred to as a wireless wide area network (WWAN)) includes base stations 102, UEs 104, an evolved packet core (EPC) 160, and another core network 190 (e.g., a 5G core (5GC)). The base stations 102 may include macrocells (high power cellular base station) and/or small cells 102' (low power cellular base station). The macrocells include base stations. The small cells 102' include femtocells, picocells, and microcells.

The base stations 102 configured for 4G LTE (collectively referred to as evolved universal mobile telecommunications system (UMTS) terrestrial radio access network (E-UTRAN)) may interface with the EPC 160 through backhaul links 132 (e.g., S1 interface). The base stations 102 configured for 5G NR (collectively referred to as next generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communications coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include home evolved Node Bs (eNBs) (HeNBs), which may provide service to a restricted group known as a closed subscriber group (CSG). The communications links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communications links 120 may use multiple-input and multiple-output (MIMO) antenna technology, including spatial multiplexing, beamforming, and/or transmit diversity. The communications links may be through one or more carriers. The base stations 102/UEs 104 may use spectrum up to Y MHz (e.g., 5, 10, 15, 20, 100, 400, etc., MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communications link 158. The D2D communications link 158 may use the DL/UL WWAN spectrum. The D2D communications link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communications may be through a variety of wireless D2D communications systems, such as FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communications links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmWave) frequencies, and/or near mmWave frequencies in communication with the UE 104. When the gNB 180 operates in mmWave or near mmWave frequencies, the gNB 180 may be referred to as an mmWave base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmWave may extend down to a frequency of 3 GHz with a wavelength of 100 millimeters. The super high frequency (SHF) band extends between 3 GHz and 30 GHz, also referred to as centimeter wave. Communications using the mmWave/near mmWave radio frequency band (e.g., 3 GHz-300 GHz) has extremely high path loss and a short range. The mmWave base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a mobility management entity (MME) 162, other MMES 164, a serving gateway 166, a multimedia broadcast multicast service (MBMS) gateway 168, a broadcast multicast service center (BM-SC) 170, and a packet data network (PDN) gateway 172. The MME 162 may be in communication with a home subscriber server (HSS) 174. The MME 162 is the control node that processes the signaling between the UEs 104 and the EPC 160. Generally, the MME 162 provides bearer and connection management. All user Internet protocol (IP) packets are transferred through the serving gateway 166, which itself is connected to the PDN gateway 172. The PDN gateway 172 provides UE IP address allocation as well as other functions. The PDN gateway 172 and the BM-SC 170 are connected to the IP services 176. The IP services 176 may include the Internet, an intranet, an IP multimedia subsystem (IMS), a PS streaming service, and/or other IP services. The BM-SC 170 may provide functions for MBMS user service provisioning and delivery. The BM-SC 170 may serve as an entry point for content provider MBMS transmission, may be used to authorize and initiate MBMS bearer services within a public land mobile network (PLMN), and may be used to schedule MBMS transmissions. The MBMS gateway 168 may be used to distribute MBMS traffic to the base stations 102 belonging to a multicast broadcast single frequency network (MBSFN) area broadcasting a particular service, and may be responsible for session management (start/stop) and for collecting evolved MBMS (eMBMS) related charging information.

The core network 190 may include an access and mobility management function (AMF) 192, other AMFs 193, a session management function (SMF) 194, and a user plane function (UPF) 195. The AMF 192 may be in communication with a unified data management (UDM) 196. The AMF 192 is the control node that processes the signaling between the UEs 104 and the core network 190. Generally, the AMF 192 provides quality of service (QoS) flow and session management. All user Internet protocol (IP) packets are transferred through the UPF 195. The UPF 195 provides UE IP address allocation as well as other functions. The UPF 195 is connected to the IP services 197. The IP services 197 may include the Internet, an intranet, an IP multimedia subsystem (IMS), a PS streaming service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as Internet of Things (IoT) devices (e.g., a parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, a receiving device, such as the UE 104, may receive sensing information from one or more other UEs 104. The UE 104 that received the sensing information may also obtain sensing information from its own measurements. The UE 104 may include a combining component 198 configured to determine whether to combine the received sensing information with sensing information obtained from its own measurements. Additionally, or alternatively, the UE 104 may include a sidelink component 199 configured to receive downlink control information (DCI) from multiple coupled DCIs. The DCI may grant reception of multiple scheduled PSSCHs over an unlicensed SL carrier. In this implementation, the DCI also requests a HARQ response for multiple scheduled PSSCHs. Additionally, in this implementation, the sidelink component 199 also receives one or more of the multiple PSSCHs from a second SL UE (for example, one of the UEs 104). Furthermore, in this implementation, sidelink component 199 transmits the HARQ response based on the one or more received PSSCHs.

In another implementation, the sidelink component 199, receives a DCI from multiple coupled DCIs. In this implementation, the DCI grants transmission of multiple PSSCHs over an unlicensed SL carrier. Additionally, in this implementation, the DCI configures an LBT for the multiple PSSCHs, and requests LBT feedback for the LBT. In this implementation, the sidelink component 199 transmits one or more of the multiple PSSCHs to a second SL UE (for example, one of the UEs 104). Furthermore, in this implementation, the sidelink component 199 transmits the LBT feedback for the one or more PSSCHs.

In some aspects, the network 100 may operate over a shared channel, which may include shared frequency bands and/or unlicensed frequency bands. For example, the network 100 may be an NR-U network operating over an unlicensed frequency band. In such an aspect, the BSs 102 and the UEs 104 may be operated by multiple network operating entities. To avoid collisions, the BSs 102 and the UEs 104 may employ a listen-before-talk (LBT) procedure to monitor for transmission opportunities (TXOPs) in the shared channel. A TXOP may also be referred to as COT. For example, a transmitting node (e.g., a BS 102 or a UE 104) may perform an LBT prior to transmitting in the channel. When the LBT passes, the transmitting node may proceed with the transmission. When the LBT fails, the transmitting node may refrain from transmitting in the channel.

An LBT can be based on energy detection (ED) or signal detection. For an energy detection-based LBT, the LBT results in a pass when signal energy measured from the channel is below a threshold. Conversely, the LBT results in a failure when signal energy measured from the channel exceeds the threshold. For a signal detection-based LBT, the LBT results in a pass when a channel reservation signal (e.g., a predetermined preamble signal) is not detected in the channel. Additionally, an LBT may be in a variety of modes. An LBT mode may be, for example, a category 4 (CAT4) LBT, a category 2 (CAT2) LBT, or a category 1 (CAT1) LBT. A CAT4 LBT may be referred to as a Type1 LBT, where the LBT is performed independently on the carrier(s) on which a transmission is occurring or going to occur. Under Type2 LBT, one carrier can be selected to have a CAT4 LBT performed, and a single interval LBT (Type2 LBT) can be performed on other carriers, which may be performed before a scheduled start time that is indicated by the UL grants. As an example, a transmitting node may determine a channel measurement in a time interval and determine whether the channel is available or not based on a comparison of the channel measurement against an ED threshold.

Although the following description may be focused on 5G NR, it may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplex (FDD) in which for a particular set of subcarriers (carrier system bandwidth), subframes within the set of subcarriers are dedicated for either DL or UL, or may be time division duplex (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

Other wireless communications technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-S-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies $\mu$ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^\mu*15$ kHz, where $\mu$ is the numerology 0 to 5. As such, the numerology $\mu=0$ has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ acknowledgment/negative acknowledgement (ACK/NACK) feedback. The PUSCH carries data, and may additionally be used to carry a buffer status report (BSR), a power headroom report (PHR), and/or UCI.

Figure 3:
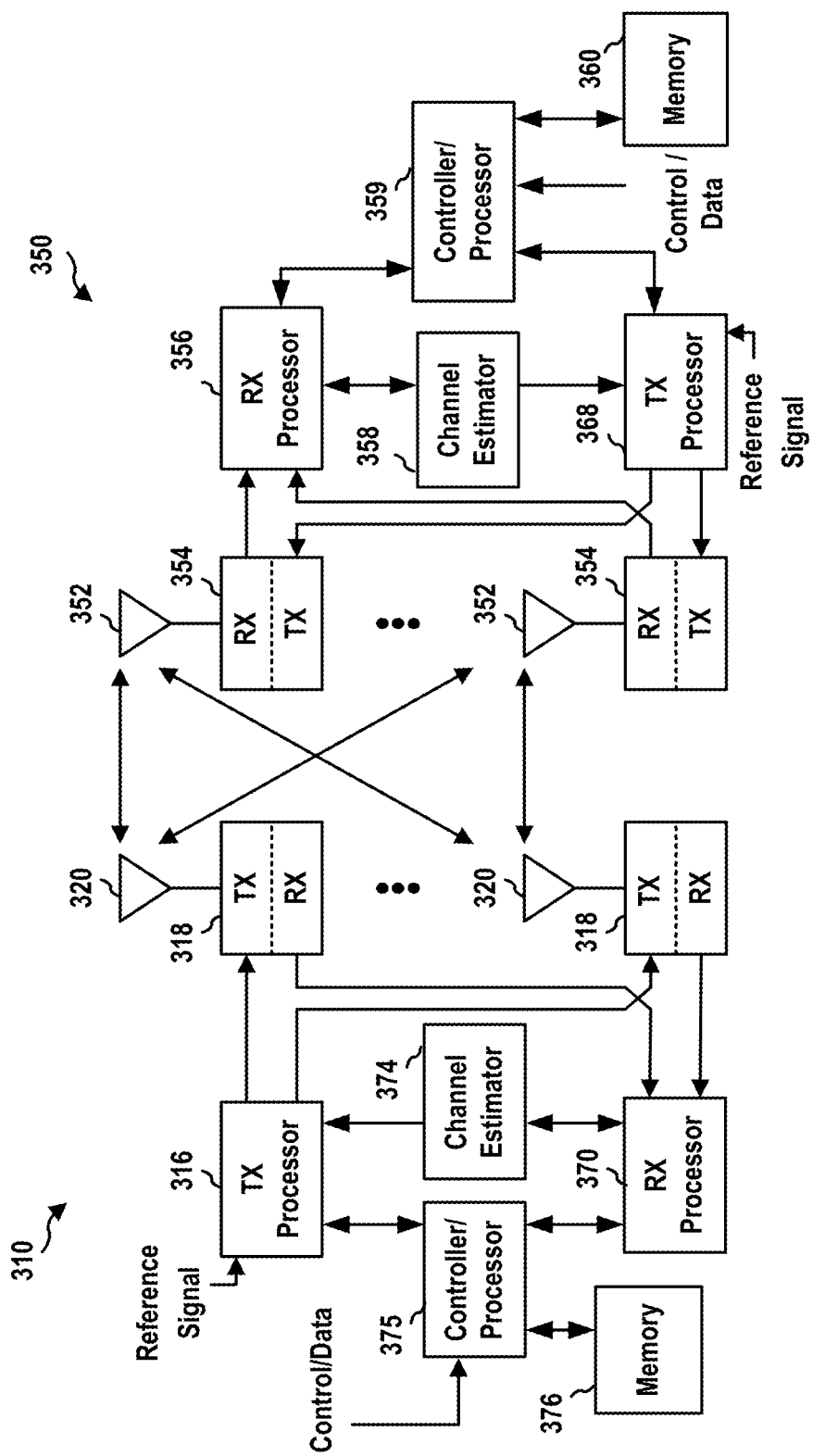
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate a radio frequency (RF) carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with the combining component 198 and/or sidelink component 199 of FIG. 1. Additionally, at least one of the TX processor 316, the RX processor 370, and the controller/processor 375 may be configured to perform aspects in connection with combining component 198 and/or sidelink component 199 of FIG. 1.

Figure 4:
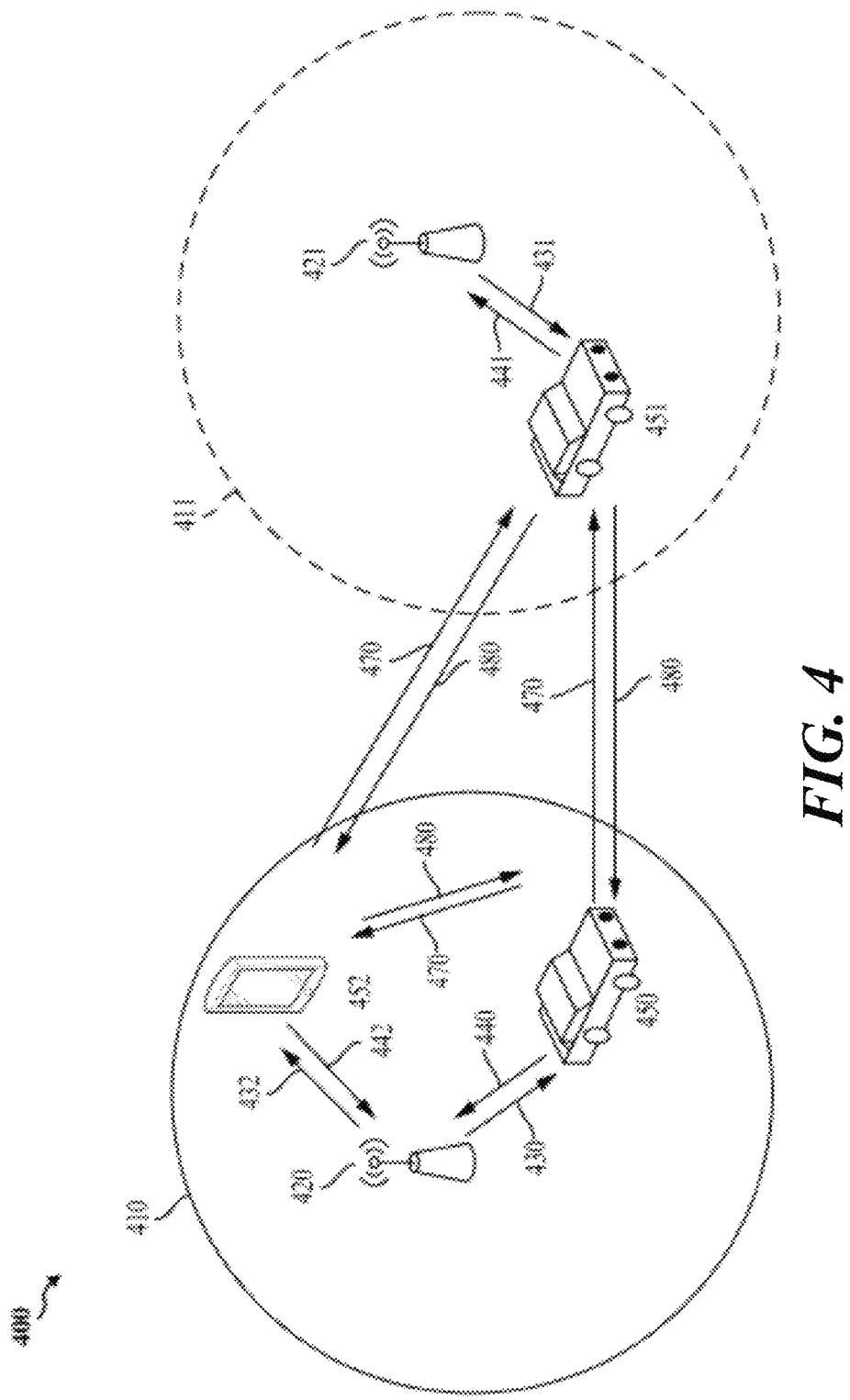
FIG. 4 is a diagram illustrating an example of a vehicle-to-everything (V2X) system, in accordance with various aspects of the present disclosure.

FIG. 4 is a diagram of a device-to-device (D2D) communications system 400, including V2X communications, in accordance with various aspects of the present disclosure. For example, the D2D communications system 400 may include V2X communications, (e.g., a first UE 450 communicating with a second UE 451). In some aspects, the first UE 450 and/or the second UE 451 may be configured to communicate in a licensed radio frequency spectrum and/or a shared radio frequency spectrum. The shared radio frequency spectrum may be unlicensed, and therefore multiple different technologies may use the shared radio frequency spectrum for communications, including new radio (NR), LTE, LTE-Advanced, licensed assisted access (LAA), dedicated short range communications (DSRC), MuLTEFire, 4G, and the like. The foregoing list of technologies is to be regarded as illustrative, and is not meant to be exhaustive.

The D2D communications system 400 may use NR radio access technology. Of course, other radio access technologies, such as LTE radio access technology, may be used. In D2D communications (e.g., V2X communications or vehicle-to-vehicle (V2V) communications), the UEs 450, 451 may be on networks of different mobile network operators (MNOs). Each of the networks may operate in its own radio frequency spectrum. For example, the air interface to a first UE 450 (e.g., Uu interface) may be on one or more frequency bands different from the air interface of the second UE 451. The first UE 450 and the second UE 451 may communicate via a sidelink component carrier, for example, via the PC5 interface. In some examples, the MNOs may schedule sidelink communications between or among the UEs 450, 451 in licensed radio frequency spectrum and/or a shared radio frequency spectrum (e.g., 5 GHz radio spectrum bands).

The shared radio frequency spectrum may be unlicensed, and therefore different technologies may use the shared radio frequency spectrum for communications. In some aspects, a D2D communications (e.g., sidelink communications) between or among UEs 450, 451 is not scheduled by MNOs. The D2D communications system 400 may further include a third UE 452.

The third UE 452 may operate on the first network 410 (e.g., of the first MNO) or another network, for example. The third UE 452 may be in D2D communications with the first UE 450 and/or second UE 451. The first base station 420 (e.g., gNB) may communicate with the third UE 452 via a downlink (DL) carrier 432 and/or an uplink (UL) carrier 442. The DL communications may be use various DL resources (e.g., the DL subframes (FIG. 2A) and/or the DL channels (FIG. 2B)). The UL communications may be performed via the UL carrier 442 using various UL resources (e.g., the UL subframes (FIG. 2C) and the UL channels (FIG. 2D)).

Figure 2:
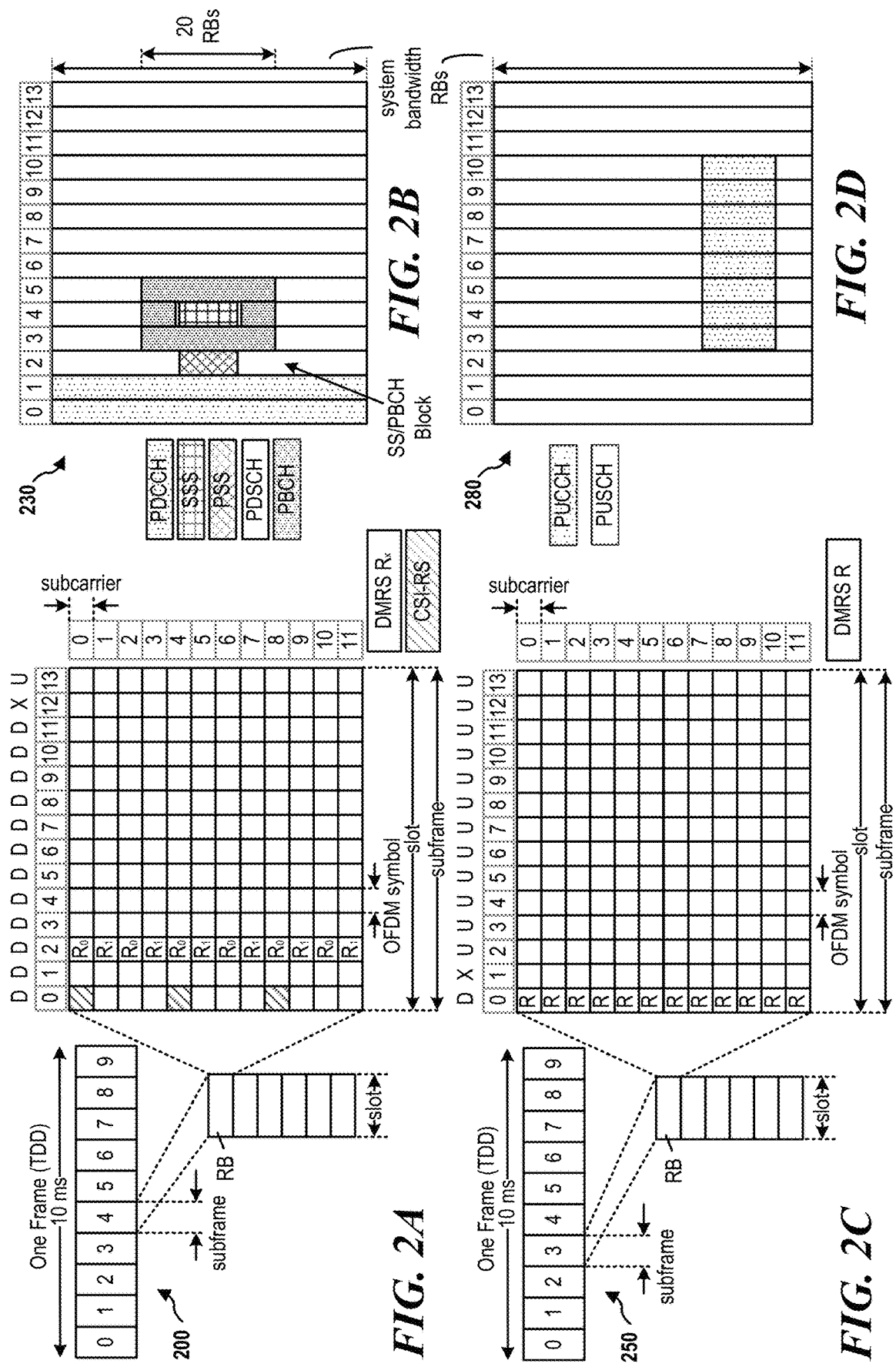
FIGS. 2A, 2B, 2C, and 2D are diagrams illustrating examples of a first fifth generation (5G) new radio (NR) frame, downlink (DL) channels within a 5G NR subframe, a second 5G NR frame, and uplink (UL) channels within a 5G NR subframe, respectively.

The first network 410 operates in a first frequency spectrum and includes the first base station 420 (e.g., gNB) communicating at least with the first UE 450, for example, as described in FIGS. 1-3. The first base station 420 (e.g., gNB) may communicate with the first UE 450 via a DL carrier 430 and/or an UL carrier 440. The DL communications may be use various DL resources (e.g., the DL subframes (FIG. 2A) and/or the DL channels (FIG. 2B)). The UL communications may be performed via the UL carrier 440 using various UL resources (e.g., the UL subframes (FIG. 2C) and the UL channels (FIG. 2D)).

In some aspects, the second UE 451 may be on a different network from the first UE 450. In some aspects, the second UE 451 may be on a second network 411 (e.g., of the second MNO). The second network 411 may operate in a second frequency spectrum (e.g., a second frequency spectrum different from the first frequency spectrum) and may include the second base station 421 (e.g., gNB) communicating with the second UE 451, for example, as described in FIGS. 1-3.

The second base station 421 may communicate with the second UE 451 via a DL carrier 431 and an UL carrier 441. The DL communications are performed via the DL carrier 431 using various DL resources (e.g., the DL subframes (FIG. 2A) and/or the DL channels (FIG. 2B)). The UL communications are performed via the UL carrier 441 using various UL resources (e.g., the UL subframes (FIG. 2C) and/or the UL channels (FIG. 2D)).

In conventional systems, the first base station 420 and/or the second base station 421 assign resources to the UEs for device-to-device (D2D) communications (e.g., V2X communications and/or V2V communications). For example, the resources may be a pool of UL resources, both orthogonal (e.g., one or more frequency division multiplexing (FDM) channels) and non-orthogonal (e.g., code division multiplexing (CDM)/resource spread multiple access (RSMA) in each channel). The first base station 420 and/or the second base station 421 may configure the resources via the PDCCH (e.g., faster approach) or RRC (e.g., slower approach).

In some systems, each UE 450, 451 autonomously selects resources for D2D communications. For example, each UE 450, 451 may sense and analyze channel occupation during the sensing window. The UEs 450, 451 may use the sensing information to select resources from the sensing window. As discussed, one UE 451 may assist another UE 450 in performing resource selection. The UE 451 providing assistance may be referred to as the receiver UE or partner UE, which may potentially notify the transmitter UE 450. The transmitter UE 450 may transmit information to the receiving UE 451 via sidelink communications.

The D2D communications (e.g., V2X communications and/or V2V communications) may be carried out via one or more sidelink carriers 470, 480. The one or more sidelink carriers 470, 480 may include one or more channels, such as a physical sidelink broadcast channel (PSBCH), a physical sidelink discovery channel (PSDCH), a physical sidelink shared channel (PSSCH), and a physical sidelink control channel (PSCCH), for example.

In some examples, the sidelink carriers 470, 480 may operate using the PC5 interface. The first UE 450 may transmit to one or more (e.g., multiple) devices, including to the second UE 451 via the first sidelink carrier 470. The second UE 451 may transmit to one or more (e.g., multiple) devices, including to the first UE 450 via the second sidelink carrier 480.

In some aspects, the UL carrier 440 and the first sidelink carrier 470 may be aggregated to increase bandwidth. In some aspects, the first sidelink carrier 470 and/or the second sidelink carrier 480 may share the first frequency spectrum (with the first network 410) and/or share the second frequency spectrum (with the second network 411). In some aspects, the sidelink carriers 470, 480 may operate in an unlicensed/shared radio frequency spectrum.

In some aspects, sidelink communications on a sidelink carrier may occur between the first UE 450 and the second UE 451. In an aspect, the first UE 450 may perform sidelink communications with one or more (e.g., multiple) devices, including the second UE 451 via the first sidelink carrier 470. For example, the first UE 450 may transmit a broadcast transmission via the first sidelink carrier 470 to the multiple devices (e.g., the second and third UEs 451, 452). The second UE 451 (e.g., among other UEs) may receive such broadcast transmission. Additionally or alternatively, the first UE 450 may transmit a multicast transmission via the first sidelink carrier 470 to the multiple devices (e.g., the second and third UEs 451, 452). The second UE 451 and/or the third UE 452 (e.g., among other UEs) may receive such multicast transmission. The multicast transmissions may be connectionless or connection-oriented. A multicast transmission may also be referred to as a groupcast transmission.

Furthermore, the first UE 450 may transmit a unicast transmission via the first sidelink carrier 470 to a device, such as the second UE 451. The second UE 451 (e.g., among other UEs) may receive such unicast transmission. Additionally or alternatively, the second UE 451 may perform sidelink communications with one or more (e.g., multiple) devices, including the first UE 450 via the second sidelink carrier 480. For example, the second UE 451 may transmit a broadcast transmission via the second sidelink carrier 480 to the multiple devices. The first UE 450 (e.g., among other UEs) may receive such broadcast transmission.

In another example, the second UE 451 may transmit a multicast transmission via the second sidelink carrier 480 to the multiple devices (e.g., the first and third UEs 450, 452). The first UE 450 and/or the third UE 452 (e.g., among other UEs) may receive such multicast transmission. Further, the second UE 451 may transmit a unicast transmission via the second sidelink carrier 480 to a device, such as the first UE 450. The first UE 450 (e.g., among other UEs) may receive such unicast transmission. The third UE 452 may communicate in a similar manner.

In some aspects, for example, such sidelink communications on a sidelink carrier between the first UE 450 and the second UE 451 may occur without having MNOs allocating resources (e.g., one or more portions of a resource block (RB), slot, frequency band, and/or channel associated with a sidelink carrier 470, 480) for such communications and/or without scheduling such communications. Sidelink communications may include traffic communications (e.g., data communications, control communications, paging communications and/or system information communications). Further, sidelink communications may include sidelink feedback communications associated with traffic communications (e.g., a transmission of feedback information for previously-received traffic communications). Sidelink communications may employ at least one sidelink communications structure having at least one feedback symbol. The feedback symbol of the sidelink communications structure may allot for any sidelink feedback information that may be communicated in the device-to-device (D2D) communications system 400 between devices (e.g., a first UE 450, a second UE 451, and/or a third UE 452). As discussed, a UE may be a vehicle (e.g., UE 450, 451), a mobile device (e.g., 452), or another type of device. In some cases, a UE may be a special UE, such as a road side unit (RSU).

Figure 5:
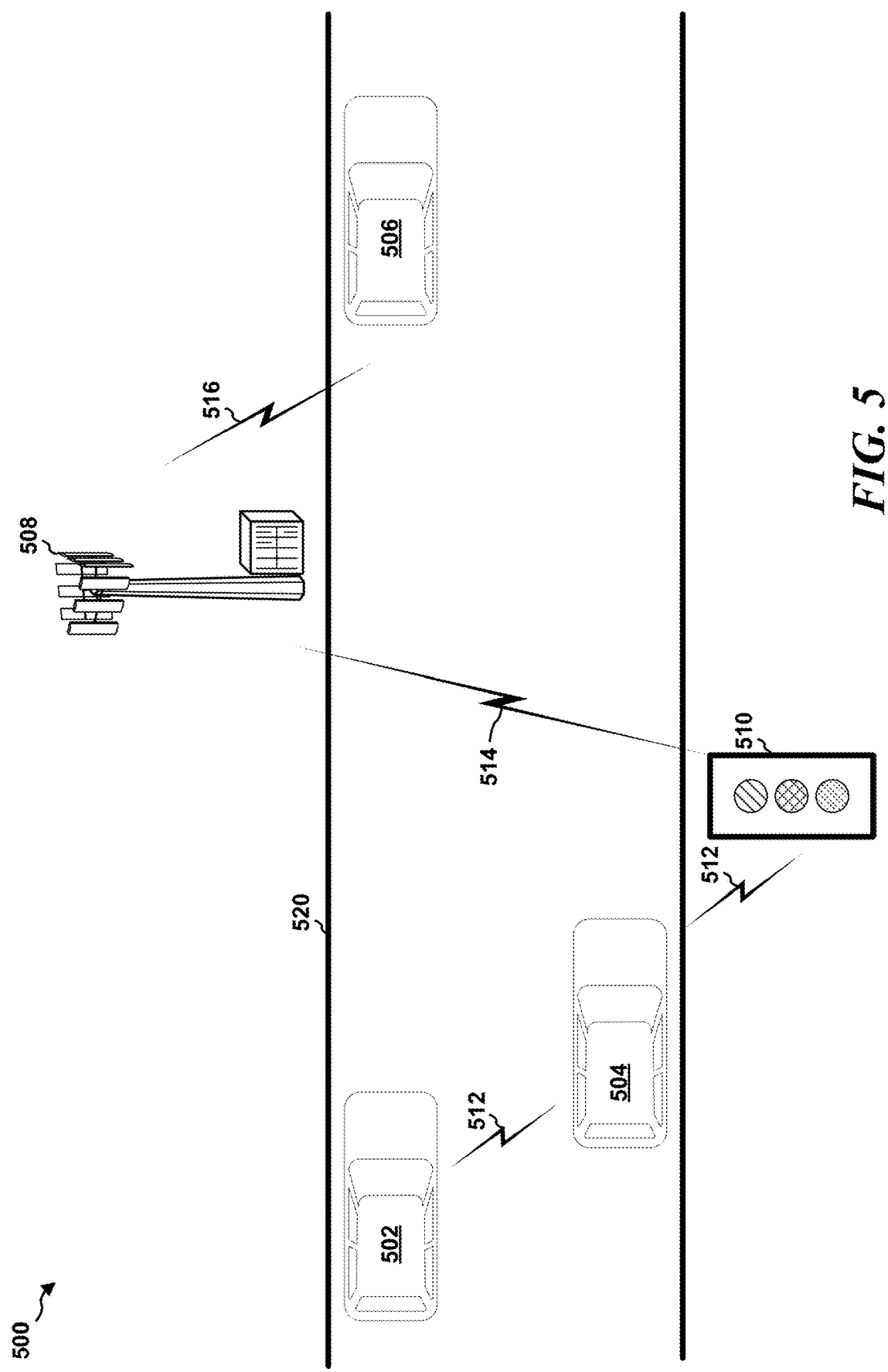
FIG. 5 is a block diagram illustrating an example of a vehicle-to-everything (V2X) system with a road side unit (RSU), in accordance with various aspects of the present disclosure.

FIG. 5 illustrates an example of a V2X system 500 with an RSU 510 according to aspects of the present disclosure. As shown in FIG. 5, a transmitter UE 504 transmits data to an RSU 510 and a receiving UE 502 via sidelink transmissions 512. Additionally, or alternatively, the RSU 510 may transmit data to the transmitter UE 504 via a sidelink transmission 512. The RSU 510 may forward data received from the transmitter UE 504 to a cellular network (e.g., gNB) 508 via an UL transmission 514. The gNB 508 may transmit the data received from the RSU 510 to other UEs 506 via a DL transmission 516. The RSU 510 may be incorporated with traffic infrastructure (e.g., traffic light, light pole, etc.) For example, as shown in FIG. 5, the RSU 510 is a traffic signal positioned at a side of a road 520. Additionally or alternatively, RSUs 510 may be stand-alone units.

Figure 6:
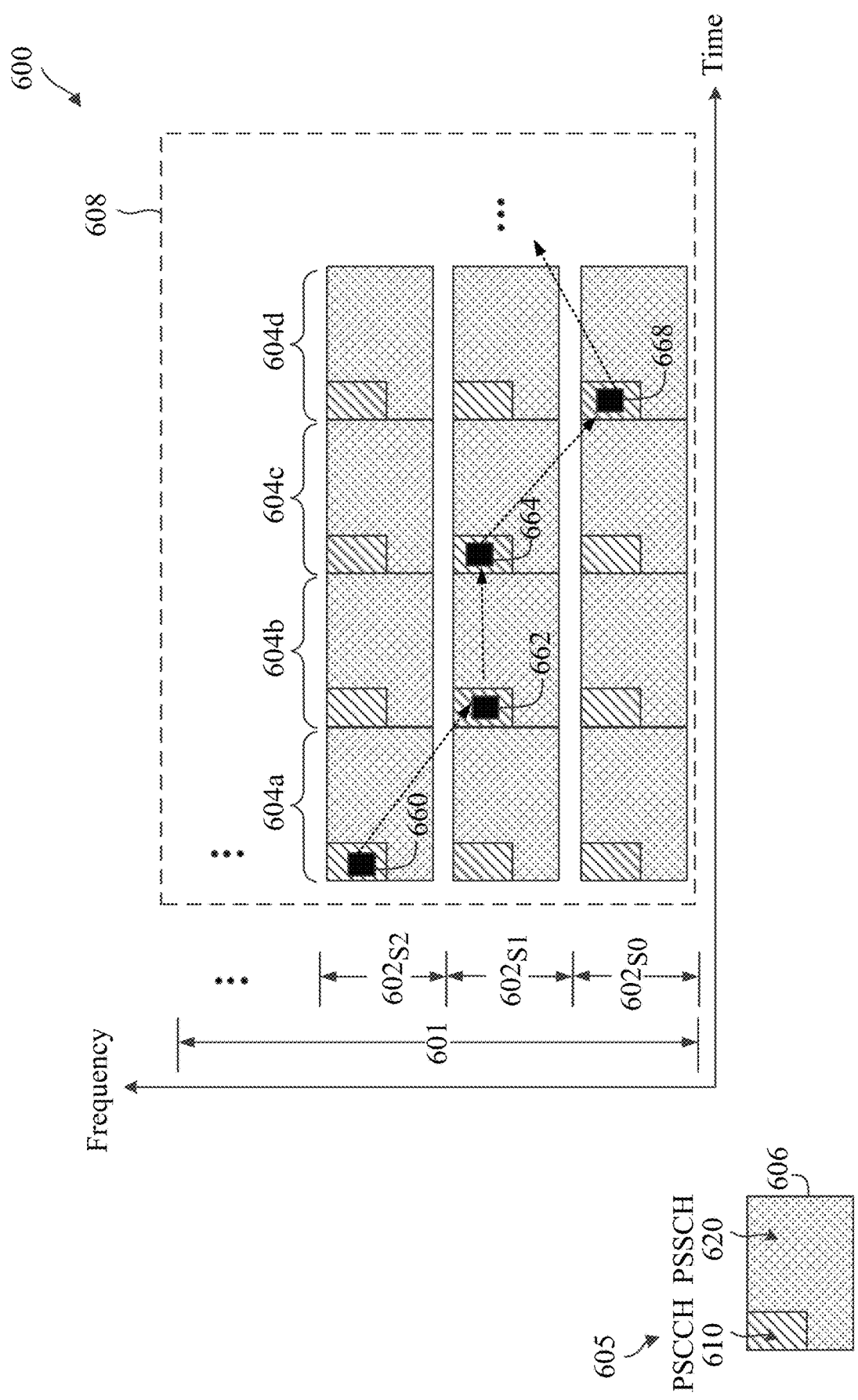
FIG. 6 is a diagram illustrating an example of a sidelink (SL) communication scheme, in accordance with various aspects of the present disclosure.

FIG. 6 is a block diagram illustrating an example of a sidelink communication scheme 600, in accordance with aspects of the present disclosure. The scheme 600 may be employed by UEs such as the UEs 104 in a network such as the network 100. In particular, sidelink UEs may employ the scheme 600 to communicate sidelink information over a shared radio frequency band (e.g., in a shared spectrum or an unlicensed spectrum). The shared radio frequency band may be shared by multiple radio access technologies. In FIG. 6, the x-axis represents time and the y-axis represents frequency.

In the scheme 600, a shared radio frequency band 601 is partitioned into multiple subchannels or frequency subbands 602 (shown as 602S0, 602S1, 602S2) in frequency and multiple sidelink frames 604 (shown as 604a, 604b, 604c, 604d) in time for sidelink communication. The frequency band 601 may be at any suitable frequencies (e.g., at about or around 2.4 GHz, 5 GHz, or 6 GHz). The frequency band 601 may have any suitable bandwidth (BW) and may be partitioned into any suitable number of frequency subbands 602. The number of frequency subbands 602 can be dependent on the sidelink communication BW requirement. The frequency band 601 may be at any suitable frequencies. In some aspects, the frequency band 601 is a 2.4 GHz unlicensed band and may have a bandwidth of about 80 megahertz (MHz) partitioned into about fifteen 5 MHz frequency subbands 602.

Each sidelink frame 604 includes a sidelink resource 606 in each frequency subband 602. A legend 605 indicates the types of sidelink channels within a sidelink resource 606. In some instances, a frequency gap or guard band may be specified between adjacent frequency subbands 602, for example, to mitigate adjacent band interference. The sidelink resource 606 may have a substantially similar structure as an NR sidelink resource. For instance, the sidelink resource 606 may include a number of subcarriers or RBs in frequency and a number of symbols in time. In some instances, the sidelink resource 606 may have a duration between about one millisecond (ms) to about 20 ms. Each sidelink resource 606 may include a PSCCH 610 and a PSSCH 620. The PSCCH 610 and the PSSCH 620 can be multiplexed in time and/or frequency. In the example of FIG. 6, for each sidelink resource 606, the PSCCH 610 is located during the beginning symbol(s) of the sidelink resource 606 and occupies a portion of a corresponding frequency subband 602, and the PSSCH 620 occupies the remaining time-frequency resources in the sidelink resource 606. In some instances, a sidelink resource 606 may also include a physical sidelink feedback channel (PSFCH), for example, located during the ending symbol(s) of the sidelink resource 606. In general, a PSCCH 610, a PSSCH 620, and/or a PSFCH may be multiplexed within a sidelink resource 606.

The PSCCH 610 may carry SCI 660 and/or sidelink data. The sidelink data can be of various forms and types depending on the sidelink application. For instance, when the sidelink application is a V2X application, the sidelink data may carry V2X data (e.g., vehicle location information, traveling speed and/or direction, vehicle sensing measurements, etc.). Alternatively, when the sidelink application is an IoT application, the sidelink data may carry IoT data (e.g., sensor measurements, device measurements, temperature readings, etc.). The PSFCH may carry feedback information, for example, HARQ ACK/NACK for sidelink data received in an earlier sidelink resource 606.

In an NR sidelink frame structure, the sidelink frames 604 in a resource pool 608 may be contiguous in time. A sidelink UE (e.g., the UEs 104) may include, in SCI 660, a reservation for a sidelink resource 606 in a later sidelink frame 604. Thus, another sidelink UE (e.g., a UE in the same NR-U sidelink system) may perform SCI sensing in the resource pool 608 to determine whether a sidelink resource 606 is available or occupied. For instance, if the sidelink UE detected SCI indicating a reservation for a sidelink resource 606, the sidelink UE may refrain from transmitting in the reserved sidelink resource 606. If the sidelink UE determines that there is no reservation detected for a sidelink resource 606, the sidelink UE may transmit in the sidelink resource 606. As such, SCI sensing can assist a UE in identifying a target frequency subband 602 to reserve for sidelink communication and to avoid intra-system collision with another sidelink UE in the NR sidelink system. In some aspects, the UE may be configured with a sensing window for SCI sensing or monitoring to reduce intra-system collision.

In some aspects, the sidelink UE may be configured with a frequency hopping pattern. In this regard, the sidelink UE may hop from one frequency subband 602 in one sidelink frame 604 to another frequency subband 602 in another sidelink frame 604. In the illustrated example of FIG. 6, during the sidelink frame 604a, the sidelink UE transmits SCI 660 in the sidelink resource 606 located in the frequency subband $602_{S2}$ to reserve a sidelink resource 606 in a next sidelink frame 604b located at the frequency subband $602_{S1}$. Similarly, during the sidelink frame 604b, the sidelink UE transmits SCI 662 in the sidelink resource 606 located in the frequency subband $602_{S1}$ to reserve a sidelink resource 606 in a next sidelink frame 604c located at the frequency subband $602_{S1}$. During the sidelink frame 604c, the sidelink UE transmits SCI 664 in the sidelink resource 606 located in the frequency subband $602_{S1}$ to reserve a sidelink resource 606 in a next sidelink frame 604d located at the frequency subband $602_{S0}$. During the sidelink frame 604d, the sidelink UE transmits SCI 668 in the sidelink resource 606 located in the frequency subband $602_{S0}$. The SCI 668 may reserve a sidelink resource 606 in a later sidelink frame 604.

The SCI can also indicate scheduling information and/or a destination identifier (ID) identifying a target receiving sidelink UE for the next sidelink resource 606. Thus, a sidelink UE may monitor SCI transmitted by other sidelink UEs. Upon detecting SCI in a sidelink resource 606, the sidelink UE may determine whether the sidelink UE is the target receiver based on the destination ID. If the sidelink UE is the target receiver, the sidelink UE may proceed to receive and decode the sidelink data indicated by the SCI. In some aspects, multiple sidelink UEs may simultaneously communicate sidelink data in a sidelink frame 604 in different frequency subbands (e.g., via frequency division multiplexing (FDM)). For instance, in the sidelink frame 604b, one pair of sidelink UEs may communicate sidelink data using a sidelink resource 606 in the frequency subband 602S2 while another pair of sidelink UEs may communicate sidelink data using a sidelink resource 606 in the frequency subband 602S1.

In some aspects, the scheme 600 is for synchronous sidelink communication. That is, the sidelink UEs may be synchronized in time and are aligned in terms of symbol boundary, sidelink resource boundary (e.g., the starting time of sidelink frames 604). The sidelink UEs may perform synchronization in a variety of forms, for example, based on sidelink synchronization signal blocks (SSBs) received from a sidelink UE and/or NR-U SSBs received from a BS (e.g., the BSs 105 and/or 205) while in-coverage of the BS. In some aspects, the sidelink UE may be preconfigured with the resource pool 608 in the frequency band 601, for example, while in coverage of a serving BS. The resource pool 608 may include multiple sidelink resources 606. The BS can configure the sidelink UE with a resource pool configuration indicating resources in the frequency band 601 and/or the subbands 602 and/or timing information associated with the sidelink frames 604. In some aspects, the scheme 600 includes mode-2 RRA (e.g., supporting autonomous RRA for out-of-coverage sidelink UEs or partial-coverage sidelink UEs).

NR sidelink has been specified in the 3rd Generation Partnership Project (3GPP) Release 16 for communications, such as V2X over an intelligent vehicle transportation systems (ITS) band or other licensed band(s). As described above, NR supports different radio resource allocation (RRA) modes. A mode-1 RRA may be specified for network controlled deployment, in which the base station issues grants to a sidelink transmitter. A mode-2 RRA may be specified for autonomous deployment, in which the sidelink transmitter UE selects a sidelink channel via a sensing operation. The sidelink (SL) transmitter (Tx) transmits SL control information (SCI) together with data, while an SL receiver (Rx) monitors SCI to determine a time and location for receiving the data from the SL transmitter.

For 3GPP Release 17 and beyond, sidelink communications may be improved to extend potential usage to enhanced mobile broadband/ultra reliable low latency communications (eMBB/URLLC). Additionally, as described, sidelink communications may be deployed over the unlicensed band, such as the 5 GHz unlicensed band and/or the 6 GHz unlicensed band.

Figure 7:
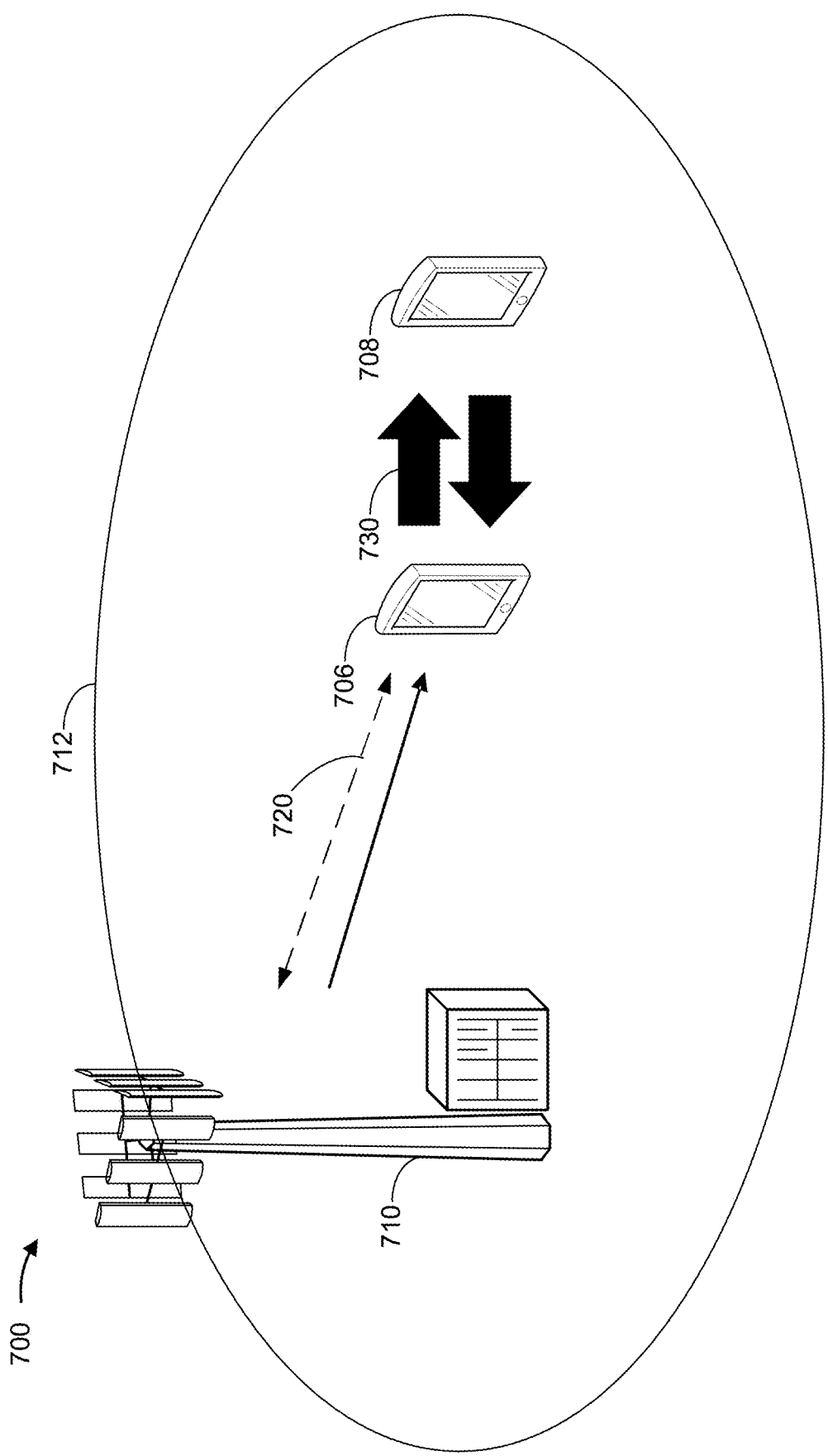
FIG. 7 is a diagram illustrating an example of a network implementing a licensed carrier and an unlicensed carrier, in accordance with various aspects of the present disclosure.

FIG. 7 is a diagram illustrating an example of a network 700 implementing a licensed carrier (shown as dashed lines) and an unlicensed carrier (shown as solid lines), in accordance with aspects of the present disclosure. The network 700 may correspond to a portion of the network 100 described with reference to FIG. 1. As shown in FIG. 7, SL UEs 706, 708 may be within network coverage 712 of a base station 710. Each SL UE 706, 708 may be an example of a UE 104, 350, 450, 451, 452, 502, 504, 506 described with reference to FIGS. 1, 3, 4, and 5, respectively. The base station 710 may be an example of a base station 102, 310, 420, 421, 508 described with reference to FIGS. 1, 3, 4, and 5, respectively.

In the example of FIG. 7, a first SL UE 706 may exchange communications 720 with the base station 710 via the licensed carrier and/or the unlicensed carrier. In the current example, the first SL UE 706 may also exchange sidelink communications 730 with a second SL UE 708 via the unlicensed carrier. The sidelink communications 730 may be direct communications, such as file transfer protocol (FTP) communications. Direct communications may be similar to eMBB communications.

In one configuration, the base station 710 grants sidelink communications 730 over an unlicensed carrier. Alternatively, the base station 710 may grant the sidelink communications 730 in addition to other sidelink communications via a licensed carrier (not shown in FIG. 7). The example of FIG. 7 avoids triangular data delivery, thereby reducing radio resources and power use.

In Release 16, SL communications are specified with a low spectral/power efficiency waveform/slot-format for the unlicensed carrier. The low spectral/power efficiency is specified because each sidelink slot includes a number of symbols for transmitter-receiver switching gaps. Additionally, non-contiguous PSSCHs are specified to avoid half-duplex deafness. The low-efficiency may reduce a quality of UE SL communications over the unlicensed carrier because a UE may perform listen-before-talk (LBT) procedures to access a channel for a time duration, the time duration may be referred to as a channel occupancy time (COT).

In some cases, Release 16 SL mode-1 assumes only the SL transmitter is within the base station's coverage. This assumption may further reduce the quality of UE SL communications. For example, the SL receiver may blindly monitor a set of sub-channels (for example, all sub-channels within a receiver resource pool) to identify a time and location for receiving data. The two-hop hybrid automatic repeat request (HARM) response from the SL receiver to the base station may consume unnecessary resources and may be error prone. In addition, in Release 16, feedback from the SL transmitter to the base station may prevent the base station from knowing the reason for a re-scheduling request. As a result, the base station may provide an incorrect grant. For example, the base station may allocate a smaller modulation coding scheme (MCS) to mitigate the conjectured fading. However, in this example, the problem may be due to an LBT failure due to congestion. In most cases, an increased number of nodes results in contended channels with reduced MCS, increased congestion, and increased LBT failure per node.

In some cases, enhanced downlink control information (DCI) format 3_0 is defined to improve the efficiency of sidelink offloading over unlicensed carrier(s). In such cases, the SL transmitter can use multiple PSSCHs facilitated by multiple LBT attempts as in NR-U. The multiple PSSCHs may be contiguous and may also satisfy COT. In such cases, it is assumed that a proper cyclic prefix (CP) extension can be leveraged to cover unnecessary switching gaps. Additionally, a base station may issue a two-stage grant for robustness against LBT uncertainty.

In some cases, when an SL receiver is in-coverage, such as the network 700 described with reference to FIG. 7, the base station may communicate with both the SL transmitter and the SL receiver to configure efficient enhanced mobile broadband (eMBB) offloading via the unlicensed carrier by using more robust control channel mechanisms over the unlicensed and licensed bands. Such configurations may facilitate power saving at the SL receiver, which can be freed from monitoring a set of SCIs. The SL receiver may also use more flexible COT features developed in NR-U (for example, scheduling of contiguous PUSCHs with more advanced multiple-input multiple-output (MIMO) support and bi-directional COT sharing for robustness against LBT uncertainty).

Figure 8A:
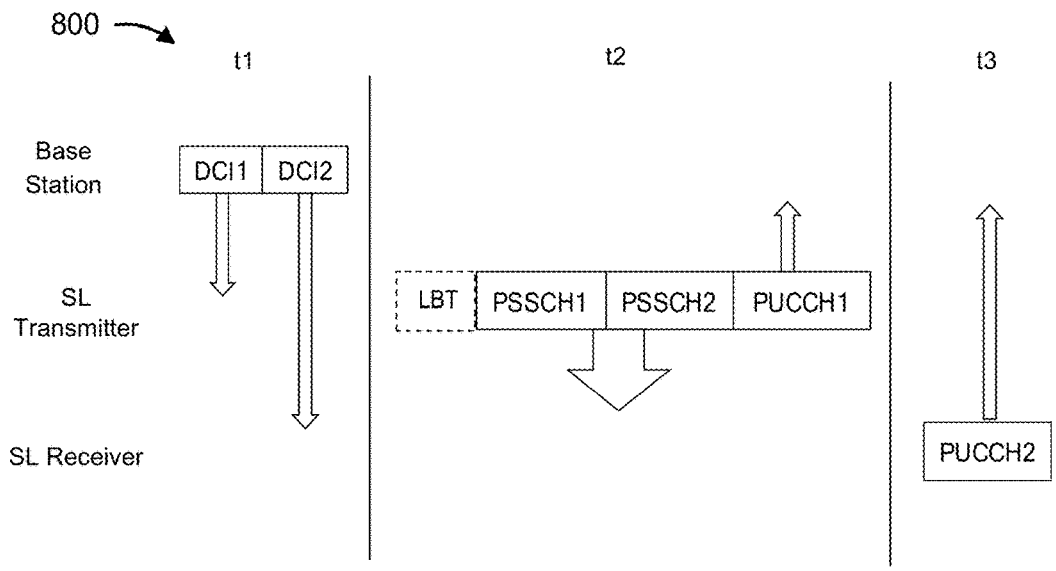
FIGS. 8A and 8B are timing diagrams illustrating examples for transmitting a pair of coupled downlink control information (DCIs) to the SL transmitter and the SL receiver, in accordance with aspects of the present disclosure.

According to aspects of the present disclosure, a base station transmits a pair of coupled DCIs to the SL transmitter and the SL receiver. FIG. 8A illustrates an example of a timing diagram 800 for transmitting coupled DCIs from a base station to an SL transmitter and an SL receiver, in accordance with aspects of the present disclosure. In the example of FIG. 8A, the base station may be an example of a base station 102, 310, 420, 421, 508, 710 described with reference to FIGS. 1, 3, 4, 5, 7, respectively, the SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. As shown in FIG. 8A, at time t1, the base station transmits a first DCI message (DCI1) to the SL transmitter and a second DCI message (DCI2) to the SL receiver In the example of FIG. 8A, each DCI, such as the first DCI and the second DCI, may be transmitted over an unlicensed carrier. The first DCI message and the second DCI message transmitted at time t1 may be an example of a pair of coupled DCIs (DCI1 and DCI2). The DCIs may include an LBT configuration and request responses from both SL UEs. In one configuration, the first DCI message grants transmission of multiple contiguous PSSCHs. As described, the contiguous PSSCHs may be transmitted without SCIs. The first DCI message may also include an LBT configuration, and may further request uplink control information (UCI) for LBT feedback (for example, LBT success or failure) for the respective PSSCHs. The LBT configuration may configure the SL transmitter to conduct a Type1 LBT for transmission of a train of PSSCHs (PSSCH1 and PSSCH2) towards the SL receiver, at time t2. That is, the first DCI message grants transmission of multiple transport blocks (TBs) over the sidelink unlicensed carrier.

Additionally, at time t2, the SL transmitter may perform LBT by listening to the PSSCHs and determining whether the PSSCHs are busy. In some examples, the SL transmitter may not transmit on the PSSCHs when the PSSCHs are busy. As an example, the PSSCHs may be busy when another device, such as another SL transmitter, is performing transmissions on the PSSCHs. Such examples may be referred to as LBT failure. In some other examples, the SL transmitter may perform one or more transmissions on the PSSCHs when the PSSCHs are not busy. Such examples may be referred to as LBT success. In some implementations, the SL transmitter may provide feedback to the base station, via a PUCCH (PUCCH1), indicating LBT success or LBT failure with regard to the PSSCHs. At time t2, the SL receiver receives one or more transmissions on the PSSCHs from the SL transmitter. At time t3, the SL receiver transmits a HARQ response, via a PUCCH (PUCCH2), to the base station. The HARQ response indicates whether the PSSCHs (PSSCH1 and PSSCH2) were successfully decoded. The NR sidelink standard in Release 16 specifies downlink control information to the SL transmitter, to schedule a single transport block over one HARQ process ID. In one configuration, the base station transmits the DCIs via the licensed carrier, and receives feedback (for example, UCIs) via the licensed carrier. For example, the SL receiver receives the second DCI message via the licensed carrier, and transmits on the PUCCH via the licensed carrier. In another configuration, the base station transmits the DCIs via the licensed carrier, and receives feedback via the unlicensed carrier. That is, in this configuration, the SL receiver receives the second DCI message via the licensed carrier, and transmits on the PUCCH via the unlicensed carrier.

In the example of FIG. 8A, the second DCI message grants reception of contiguous PSSCHs (PSSCH1 and PSSCH2). The contiguous PSSCHs may be transmitted without SCIs. The second DCI message may request feedback (for example, a UCI) for HARQ ACK/NACK response for transmissions on the respective PSSCHs. The HARQ ACK/NACK may be transmitted via a PUCCH (PUCCH2), at time t3.

Figure 8B:
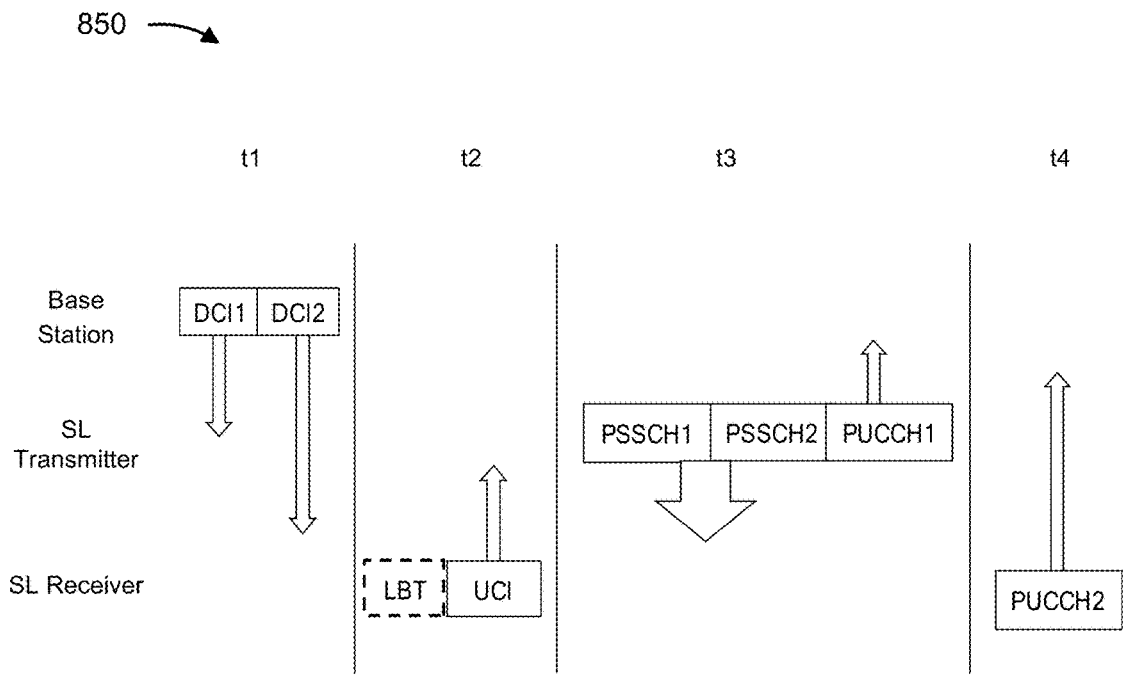

FIG. 8B illustrates an example of a timing diagram 850 for transmitting coupled DCIs from a base station to an SL transmitter and an SL receiver, in accordance with aspects of the present disclosure. In the example of FIG. 8B, the base station may be an example of a base station 102, 310, 420, 421, 508, 710 described with reference to FIGS. 1, 3, 4, 5, 7, respectively, the SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. As shown in FIG. 8B, at time t1, a base station transmits a first DCI message (DCI1) to the SL transmitter and a second DCI message (DCI2) is transmitted to the SL receiver. In the example of FIG. 8B, each DCI, such as the first DCI and the second DCI, may be transmitted over the unlicensed carrier or licensed carrier. The second DCI message requests the SL receiver to conduct a Type1 LBT and share a COT with the SL transmitter. The COT may be shared via UCI. For example, the SL receiver may indicate that the COT is being shared via a COT sharing indicator included in the UCI. At time t2, the SL receiver performs the LBT and may share its COT with the SL transmitter. In this configuration, the initiating physical uplink control channel (PUCCH) transmission from the SL receiver may notify the SL transmitter that the SL receiver's COT is being shared. The first DCI message grants a transmission of a train of PSSCHs (PSSCH1 and PSSCH2) towards the SL receiver, at time t3 (within the COT). Additionally, at time t3, the SL transmitter transmits LBT feedback to the base station via a PUCCH (PUCCH1). As described, the LBT feedback may indicate LBT success or LBT failure with regards to the PSSCHs. At time t3, the SL receiver receives one or more transmissions on the PSSCHs from the SL transmitter. At time t4, the SL receiver transmits a HARQ response, via a PUCCH (PUCCH2), to the base station. The HARQ response indicates whether the PSSCHs were successfully decoded.

For ease of explanation, in FIGS. 8A and 8B, as well as other examples, the coupled DCIs are described as a pair of DCIs. The coupled DCIs are not limited to a pair of DCIs. The coupled DCIs may include two or more DCIs.

Aspects of the present disclosure may improve reliability of control signaling in carrier aggregation (CA) deployment, specifically for the SL receiver. Additionally, the feedback received at the base station may be improved by including information for the sidelink over the unlicensed carrier. The base station's scheduling decision may be improved as a result of the improved feedback. Furthermore, power saving at the SL receiver may be improved because the SL receiver may no longer perform blind decoding over a set of, or all, sub-channels in a receiver resource pool. Finally, reduced dependence on SCI and the physical sidelink feedback channel (PSFCH) can provide novel waveform/slot format design for the SL transmitter over the unlicensed carrier.

Figure 9:
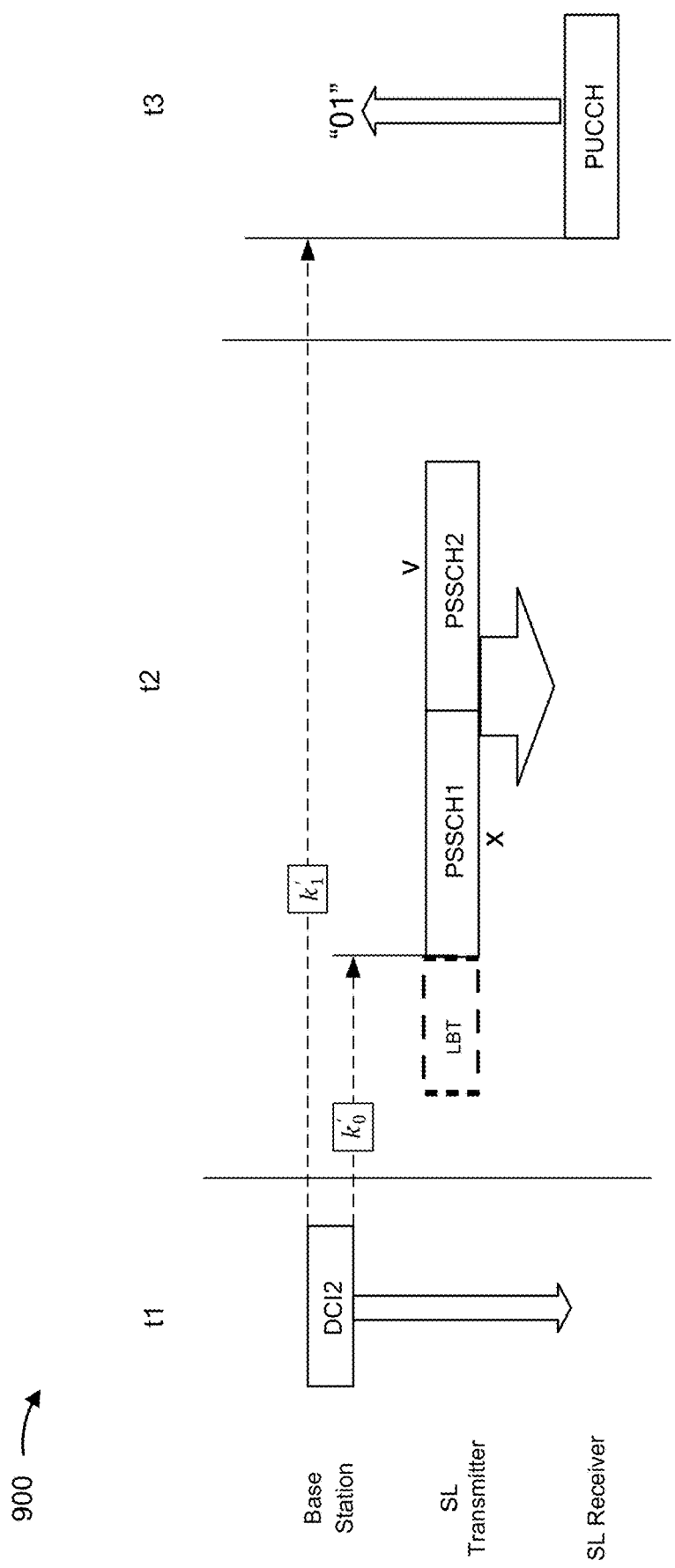
FIG. 9 is a timing diagram illustrating an example of transmitting a second DCI to the SL receiver, in accordance with aspects of the present disclosure.

FIG. 9 is a timing diagram 900 illustrating an example of transmitting a second DCI from a base station to an SL receiver, in accordance with aspects of the present disclosure. In the example of FIG. 9, the base station may be an example of a base station 102, 310, 420, 421, 508, 710 described with reference to FIGS. 1, 3, 4, 5, 7, respectively, an SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. The timing diagram 900 may correspond to a portion of the timing diagram 800 described with reference to FIG. 8A. In the example of FIG. 9, the second DCI message (DCI2) transmitted by the base station to the SL receiver at time t1 includes time domain resource allocation (TDRA) for multiple contiguous PSSCHs and corresponding HARQ identifiers, new data indicators, redundancy versions, modulation coding schemes, transmission configuration indicators, and a common frequency domain resource allocation (FDRA). In the example of FIG. 9, the second DCI may include timing information for transmissions by the SL transmitter and the SL receiver. As shown in FIG. 9, the second DCI may include a value $k'_0$ indicating a number of slots between the second DCI message, transmitted at time t1, and a slot for a first PSSCH (PSSCH1) resource transmission (time t2), where the value $k'_0$ is greater than zero. Additionally, the second DCI may include a value $k'_1$ indicating a number of slots between the second DCI message and a PUCCH resource for a HARQ response, transmitted at time t3, where the value $k'_1$ is greater than zero. The value $k'_1$ may be large enough to absorb a processing delay at the SL receiver. In some implementations, the SL receiver may not blindly decode one or more SCIs, rather, the SL receiver may decode the PSSCHs received from the SL transmitter based on the grant in the second DCI message. Additionally, as shown in FIG. 9, at time t3, the SL receiver transmits a HARQ response for the PSSCHs scheduled by the second DCI message. The HARQ response may include a bit-map, where a bit value of 1 indicates the cyclic redundancy check (CRC) passed for a corresponding PSSCH, and a bit value of 0 indicates the CRC failed. In the example of FIG. 9, the CRC failed for the first PSSCH (shown as "X" in FIG. 9) and passed for the second PSSCH (shown as "V" in FIG. 9). Therefore, at time t3, the SL receiver transmits a bitmap of "01" via the PUCCH to the base station.

Figure 10:
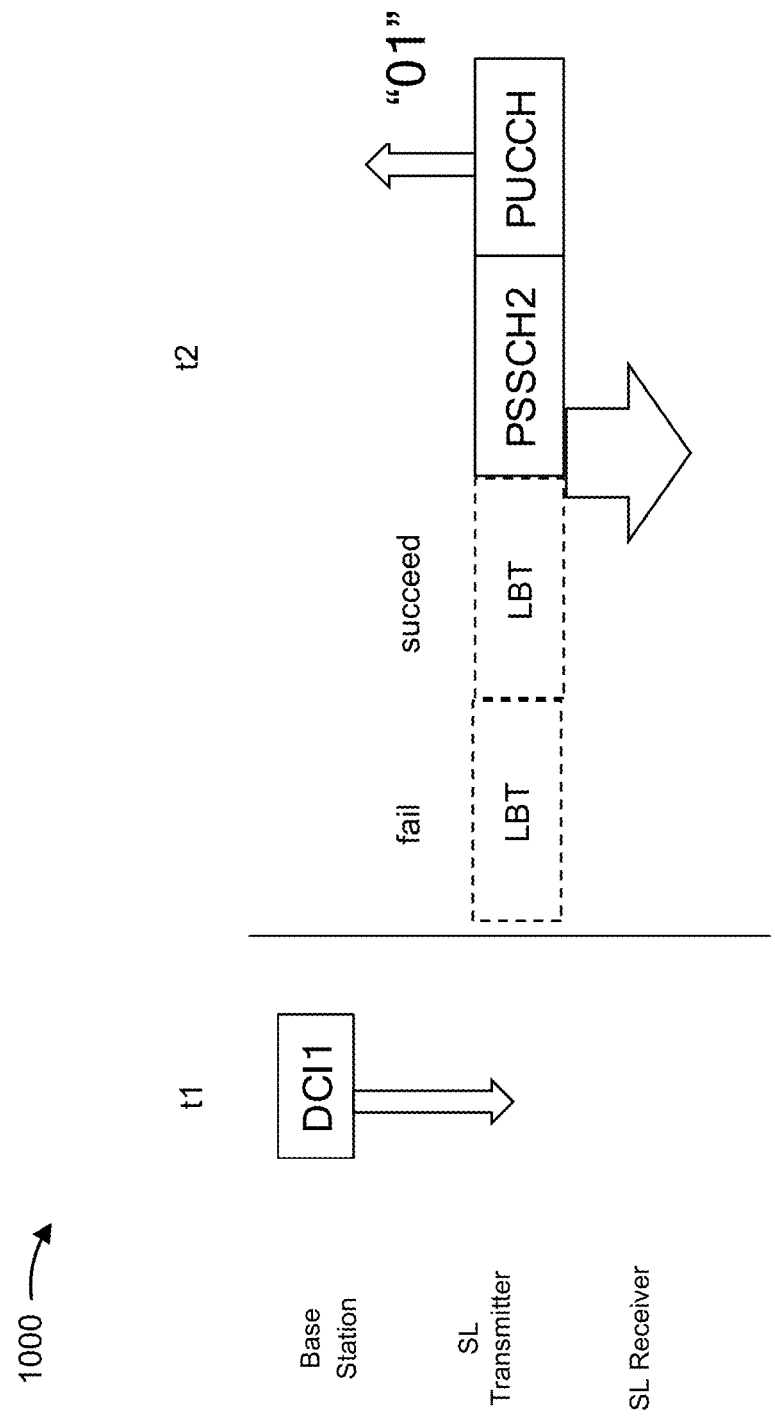
FIG. 10 is a timing diagram illustrating an example of transmitting a first DCI to the SL transmitter, in accordance with aspects of the present disclosure.

FIG. 10 is a timing diagram 1000 illustrating an example of transmitting a first DCI from a base station to an SL transmitter, in accordance with aspects of the present disclosure. In the example of FIG. 10, the base station may be an example of a base station 102, 310, 420, 421, 508, 710 described with reference to FIGS. 1, 3, 4, 5, 7, respectively, an SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. The timing diagram 1000 may correspond to a portion of the timing diagram 800 described with reference to FIG. 8A. In the example of FIG. 10, the first DCI message (DCI1), transmitted by the base station at time t1, may include content based on DCI format 1_0 for NR-U Release 16. The first DCI message may also include a grant for a PUCCH. The grant may specify the timing of the PUCCH. For example, the timing may be in reference to the first DCI message. As another example, the PUCCH is scheduled after the last scheduled PSSCH (for example, PSSCH2, as shown in FIG. 10).

The sounding reference signal (SRS) resource indicator (SRI) and/or pre-coding information of the PUCCH may be different from the SRI and/or pre-coding information of the scheduled PSSCHs. As described, at time t2, the SL transmitter does not transmit SCI corresponding to the PSSCHs. As shown in FIG. 10, at time t2, the SL transmitter conducts multiple Type1 LBT attempts for multiple PSSCHs. That is, each LBT attempt may correspond to a unique PSSCH attempt. After a successful LBT, the SL transmitter may transmit the corresponding PSSCH (for example, without SCI). As shown in FIG. 10, a first LBT failed, and a second LBT succeeded. The second LBT corresponds to a second PSSCH (PSSCH2). Thus, at time t2, the SL transmitter performs transmissions on the second PSSCH to the SL receiver (SL Rx).

Finally, at time t2, the SL transmitter transmits LBT feedback via a PUCCH. The LBT feedback may include a bitmap for respective PSSCHs, where a bit value of 1 indicates a corresponding PSSCH has been transmitted (for example, LBT success), and a bit value of 0 indicates a corresponding PSSCH has not been transmitted (for example, LBT fail). As described, in the example of FIG. 10, the first LBT failed and the second LBT succeeded, therefore, the bitmap transmitted via the PUCCH at time t2 is set to "01". Alternatively, the UCI transmitted via the PUCCH may include an index of a PSSCH transmitted after LBT success.

In one implementation, the SL receiver may compute a log-likelihood ratio (LLR) and combine the LLRs based on demodulation reference signal (DMRS) sequence detection. The SL receiver may apply two thresholds for the detecting metric. A first threshold may be used from an initial PSSCH to an initial CRC pass and a second threshold after the initial CRC pass. The first threshold may be greater than the second threshold. In addition to the HARQ ACK/NACK described above with reference to FIGS. 8A, 8B, and 9, the SL receiver may report a second UCI indicating whether the SL receiver has stored and combined LLRs for respective HARQ processes. The second UCI may be referred to as a combined LLR UCI.

In one implementation, based on the combined LLR UCI from the SL receiver and the LBT feedback from the SL transmitter, the base station may determine whether the SL receiver has incorrectly managed the HARQ soft-information. Accordingly, the base station may correct the HARQ soft-information management in subsequent scheduling by requesting the SL receiver to flush a HARQ buffer.

Figure 11:
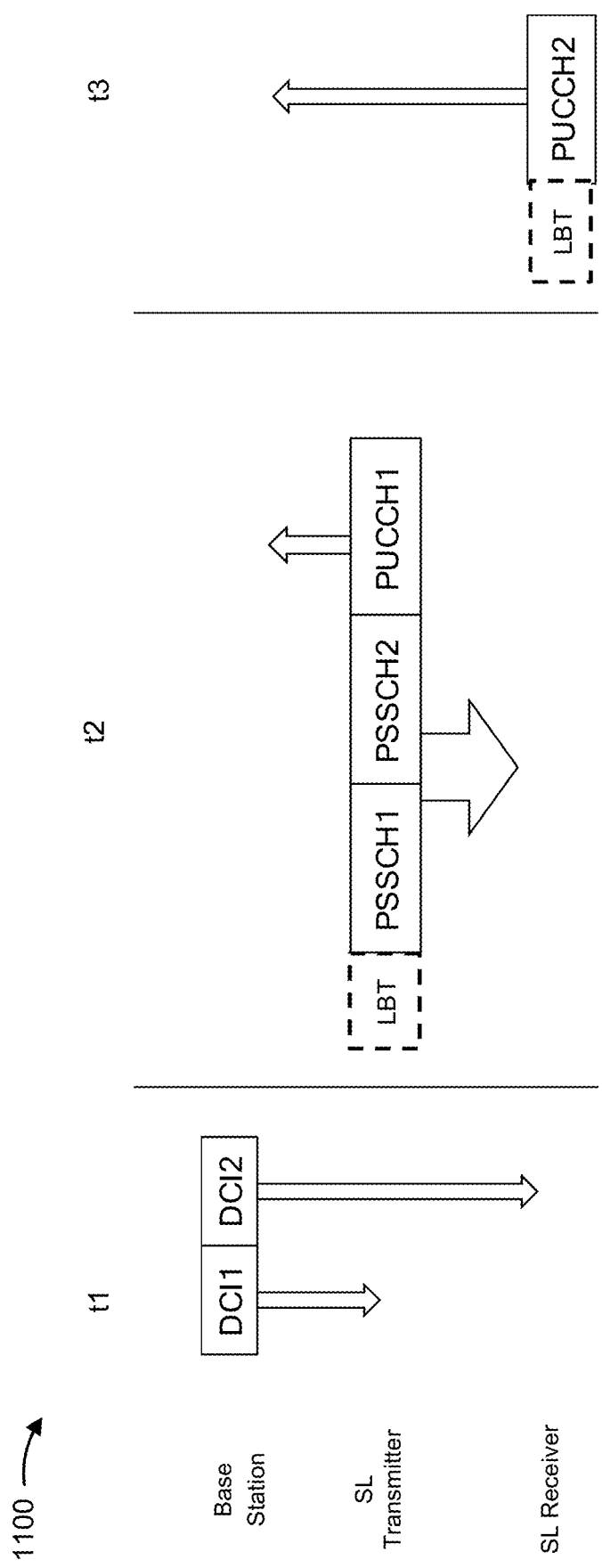
FIG. 11 is a timing diagram illustrating an example of transmitting a pair of coupled DCIs to the SL transmitter and the SL receiver, in accordance with aspects of the present disclosure.

FIG. 11 illustrates an example of a timing diagram 1100 for transmitting a pair of coupled DCIs from a base station to an SL transmitter and an SL receiver, in accordance with aspects of the present disclosure. In the example of FIG. 9, the base station may be an example of a base station 102, 310, 420, 421, 508, 710 described with reference to FIGS. 1, 3, 4, 5, 7, respectively, an SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. As shown in FIG. 11, at time t1, a base station transmits a first DCI (DCI1) to the SL transmitter and a second DCI (DCI2) to the SL receiver. In the example of FIG. 11, each DCI, such as the first DCI and the second DCI, may be transmitted over the unlicensed carrier or licensed carrier.

In one configuration, in the absence of a licensed carrier, the base station configures LBT for respective PUCCHs. That is, LBT may be configured because the PUCCH is transmitted via an unlicensed carrier. In one example, the SL transmitter can be configured to transmit a PUCCH (PUCCH1) within a same COT as the scheduled PSSCHs (PSSCH1 and PSSCH2). As shown in FIG. 11, the SL transmitter may transmit the PUCCH (PUCCH1), at time t2, without performing a separate LBT for the PUCCH. Rather, the LBT performed for the PSSCHs may be used for the PUCCH as both the PSSCH and PUCCH are transmitted within the same COT. The SL transmitter may transmit the PUCCH based on a discontinuous transmission (DTX) configuration if all of the LBT attempts fail.

As shown in FIG. 11, at time t3, the SL receiver may perform LBT prior to transmitting the PUCCH (PUCCH2). The type of LBT to be performed may be indicated in the second DCI. In one configuration, the SL receiver is configured for Type1 LBT to report all HARQ responses and a soft buffer (leaving enough time for UE processing). In another configuration, the SL receiver is configured to use Type2 LBT for an early report if CRC passed for a PSSCH transmission from the SL transmitter. When the CRC passes for the PSSCH transmission, the SL receiver may assume the SL transmitter may share a COT. In this configuration, the second DCI message may provide an additional field for a delayed UCI message.

Figure 12A:
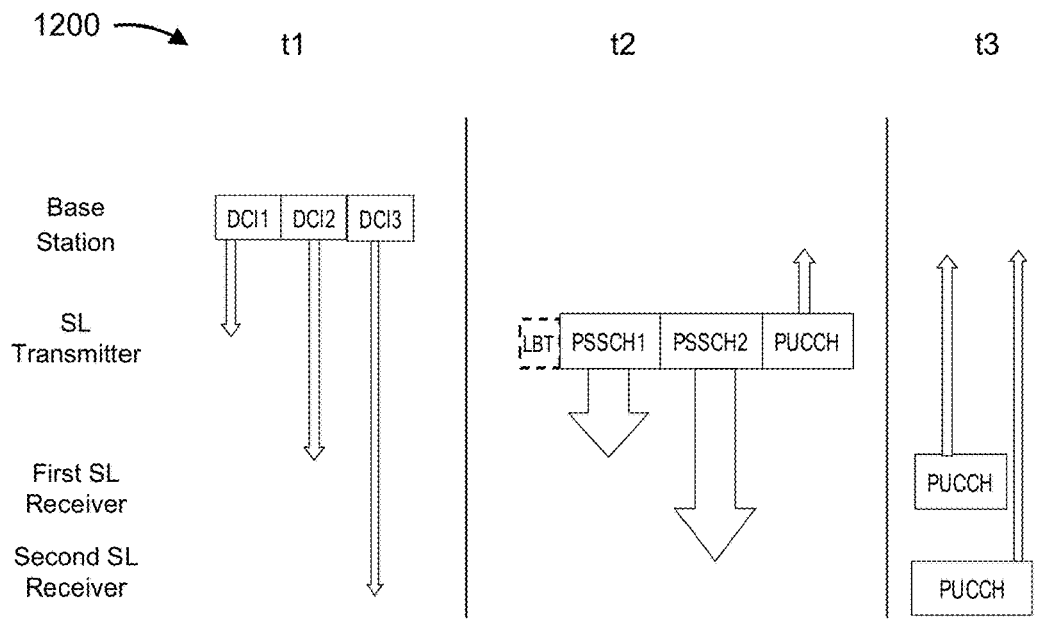
FIGS. 12A and 12B are timing diagrams illustrating examples of transmitting coupled DCIs to multiple SL receivers and one SL transmitter, in accordance with aspects of the present disclosure.
Figure 12B:
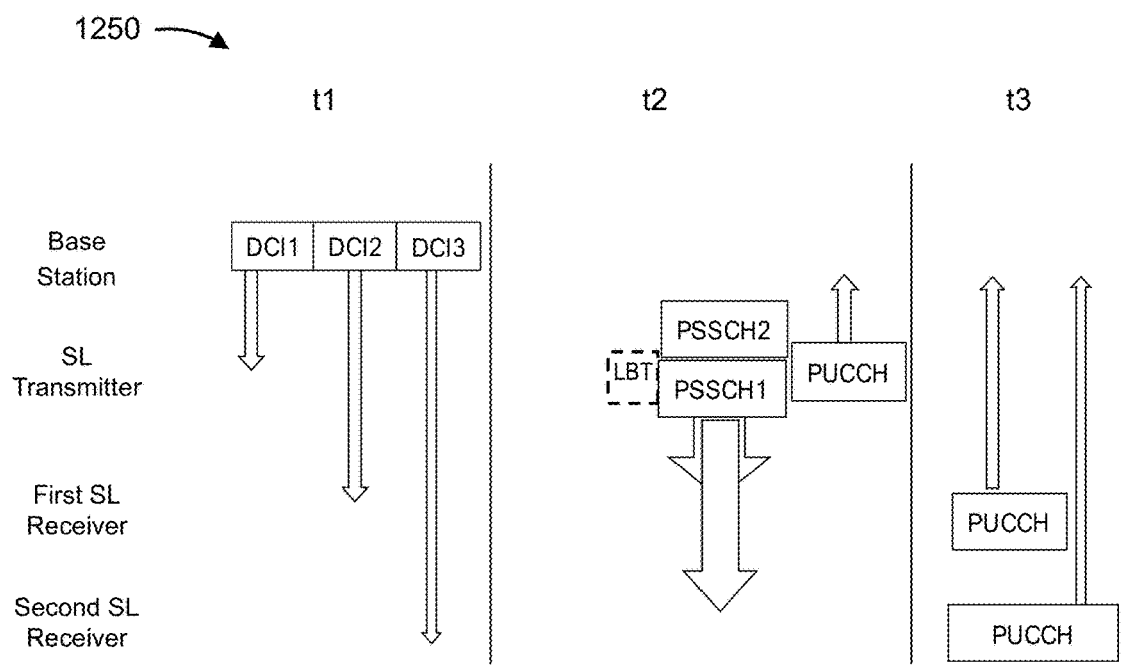

According to another aspect of the present disclosure, multiple SL receivers can be configured by transmitting a DCI to each one of the multiple SL receivers and a DCI to the SL transmitter. FIGS. 12A and 12B are timing diagrams 1200, 1250 illustrating examples of transmitting coupled DCIs from a base station to multiple SL receivers (e.g., a first SL receiver and an SL receiver) and one SL transmitter, in accordance with aspects of the present disclosure. In the examples of FIGS. 12A and 12B, the base station may be an example of a base station 102, 310, 420, 421, 508, 710 described with reference to FIGS. 1, 3, 4, 5, 7, respectively, an SL transmitter may be an example of a UE 104, 350, 450, 451, 452, 502, 504, 506, 706 described with reference to FIGS. 1, 3, 4, 5, and 7, respectively, and each SL receiver may be an example of a UE 104, 350, 450, 451, 452, 502, 504, 506, 708 described with reference to FIGS. 1, 3, 4, 5, and 7, respectively. As shown in FIGS. 12A and 12B, at time t1, a base station transmits a first DCI (DCI1) to an SL transmitter a second DCI (DCI2) to a first SL receiver, and a third DCI (DCI3) to a second SL receiver. In the example of FIGS. 12A and 12B, each DCI, such as the first DCI, the second DCI, and the third DCI, may be transmitted over the unlicensed carrier or licensed carrier.

The first DCI message transmitted to the SL transmitter may configure different sets of PSSCHs, each PSSCH having a unique MCS, SRI, and precoding. As shown in FIG. 12A, at time t2, the SL transmitter may perform may perform LBT by listening to the PSSCHs and determining whether the PSSCHs are busy. In some examples, the SL transmitter may not transmit on the PSSCHs when the PSSCHs are busy. As an example, the PSSCHs may be busy when another device, such as another SL transmitter, is performing transmissions on the PSSCHs. Such examples may be referred to as LBT failure. In some other examples, the SL transmitter may perform one or more transmissions on the PSSCHs when the PSSCHs are not busy. Such examples may be referred to as LBT success. In some implementations, the SL transmitter may provide feedback to the base station, via a PUCCH, indicating LBT success or LBT failure with regard to the PSSCHs. Additionally, at time t2, each set of PSSCHs (PSSCH1 and PSSCH2) may be transmitted by the SL transmitter to a different SL receiver. In one configuration, as shown in FIG. 12A, the different sets of PSSCHs may be time-division multiplexed when transmitted at time t2. In another configuration, as shown in FIG. 12B, the different sets of PSSCHs may be frequency-division multiplexed when transmitted at time t2. In other configurations, the different sets of PSSCHs may be spatial-division multiplexed or multi-cast.

In the examples of FIGS. 12A and 12B, at time t3, each SL receiver transmits a HARQ response to the base station via a PUCCH. For example, SL Rx1 may transmit a HARQ response corresponding to PSSCH1, and SL Rx2 may transmit a HARQ response corresponding to PSSCH2. The examples of FIGS. 12A and 12B avoid multiple CRC bits in the DCIs, reduce the number of PUCCHs at the SL transmitter, and reduce the number of LBT attempts for PSSCHs over the unlicensed carrier. Additionally, as described, the SL receiver may also use more flexible COT features developed in NR-U. Thus, according to aspects of the present disclosure, bi-directional COT sharing between the SL transmitter and the SL receiver may mitigate a need for the SL receiver to perform LBT prior to performing an uplink transmission.

Figure 13A:
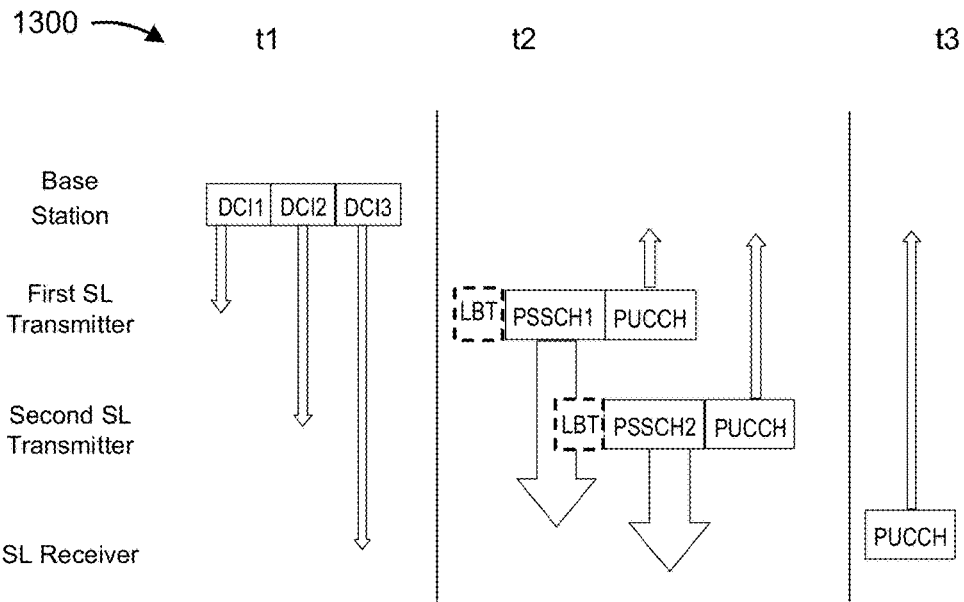
FIGS. 13A and 13B are timing diagrams illustrating examples of transmitting coupled DCIs to multiple SL receivers and one SL transmitter, in accordance with aspects of the present disclosure.
Figure 13B:
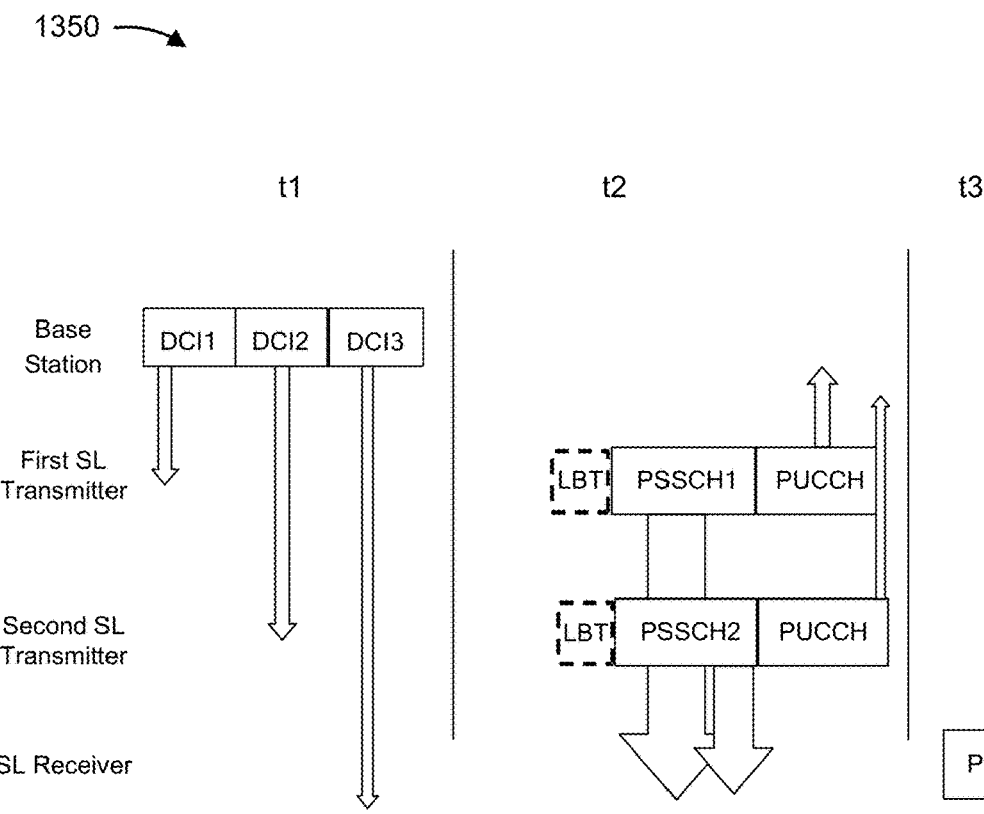

According to another aspect of the present disclosure, multiple SL transmitters can be configured by transmitting a DCI to each of the SL transmitters and a DCI to the SL receiver. FIGS. 13A and 13B are timing diagrams 1300, 1350 illustrating examples of transmitting coupled DCIs from a base station to multiple SL transmitters (e.g., a first SL transmitter and a second SL transmitter) and one SL receiver, in accordance with aspects of the present disclosure. In the examples of FIGS. 13A and 13B, the base station may be an example of a base station 102, 310, 420, 421, 508, 710 described with reference to FIGS. 1, 3, 4, 5, 7, respectively, each SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. As shown in FIGS. 13A and 13B, at time t1, the base station transmits a first DCI (DCI1) to the first SL transmitter a second DCI (DCI2) to the second SL transmitter, and a third DCI (DCI3) to the SL receiver. In the examples of FIGS. 13A and 13B, each DCI, such as the first DCI, the second DCI, and the third DCI, may be transmitted over the unlicensed carrier.

In the example of FIGS. 13A and 13B, the first DCI and the second DCI transmitted to the first SL transmitter and the second SL transmitter, respectively, may configure a different PSSCH (PSSCH1 and PSSCH2), each PSSCH may have a unique MCS, SRI, and precoding. Additionally, at time t2, each SL transmitter may perform a PSSCH transmission to the SL receiver based on the received DCI. In one configuration, as shown in FIG. 13A, based on the received DCIs (e.g., the first and second DCIs), the first SL transmitter and the second SL transmitter may perform time-division multiplexed transmissions, such that the transmissions on the respective PSSCHS at time t2 do not overlap in time. In another configuration, as shown in FIG. 13B, based on the received DCIs, first SL transmitter and the second SL transmitter may perform frequency-division multiplexed, spatial-division multiplexed, or multi-cast transmissions on the respective PSSCHs at time t2.

Additionally, as shown in FIGS. 13A and 13B, at time t2, prior to performing a PSSCH transmission, each SL transmitter may perform LBT by listening to the PSSCH and determining whether the PSSCH is busy. In some examples, the SL transmitter may not transmit on the PSSCH when the PSSCH is busy. As an example, the PSSCHs may be busy when another device, such as another SL transmitter, is performing a PSSCH transmission. Such examples may be referred to as LBT failure. In some other examples, the SL transmitter may perform a PSSCH transmission when the PSSCH is not busy. Such examples may be referred to as LBT success. In some implementations, each SL transmitter may provide feedback to the base station, via a PUCCH, indicating LBT success or LBT failure with regard to the PSSCH.

In the example of FIGS. 13A and 13B, the third DCI received at the SL receiver may configure the reception of different PSSCHs (PSSCH1 and PSSCH2) transmissions at time t3, where PSSCH transmission is from a different SL transmitter. As described, in one configuration, as shown in FIG. 13A, the different PSSCHs may be time-division multiplexed. In another configuration, as shown in FIG. 13B, the different PSSCHs may be frequency-division multiplexed, spatial-division multiplexed, or multi-cast. Additionally, in the examples of FIGS. 13A and 13B, at time t3, the SL receiver transmits a HARQ response to the base station via a PUCCH. The examples of FIGS. 13A and 13B may reduce a number of CRC bits in the DCIs, and reduce a number of PUCCHs at the SL receiver. As shown in FIGS. 12A, 12B, 13A, and 13B, the coupled DCIs may be transmitted to multiple SL transmitters or multiple SL receivers. In some implementations, the coupled DCIs may be transmitted to multiple SL transmitters and multiple SL receivers.

Figure 14:
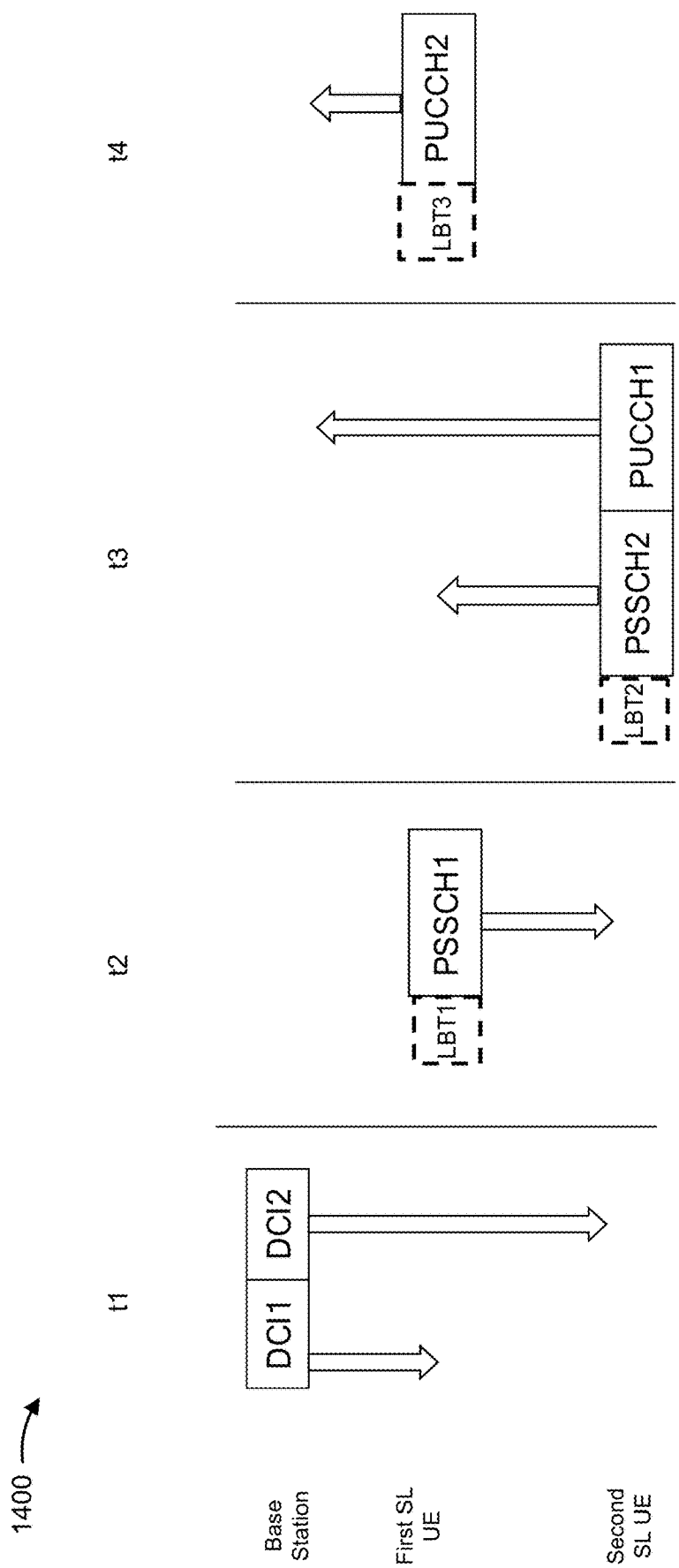
FIG. 14 is a timing diagram illustrating an example of granting bi-directional SL transmissions over the unlicensed carrier via coupled DCIs, in accordance with aspects of the present disclosure.

According to another aspect of the present disclosure, the coupled DCIs may grant bi-directional sidelink transmissions over the unlicensed carrier. FIG. 14 is a timing diagram 1400 illustrating an example of a base station transmitting coupled DCIs for granting bi-directional sidelink transmissions over the unlicensed carrier, in accordance with aspects of the present disclosure. Each respective DCI of the coupled DCIs may be transmitted to a single SL UE from multiple SL UEs, such as a first SL UE and a second SL UE. In the examples of FIG. 14, the base station may be an example of a base station 102, 310, 420, 421, 508, 710 described with reference to FIGS. 1, 3, 4, 5, 7, respectively, the first SL UE and the second SL UE may be an example of a UE 104, 350, 450, 451, 452, 502, 504, 506, 706, 708 described with reference to FIGS. 1, 3, 4, 5, and 7, respectively. As shown in FIG. 14, at time t1, the base station transmits a first DCI (DCI1) to the first SL UE (SL UE1) and a second DCI (DCI2) to the second SL UE. In the example of FIG. 14, each DCI, such as the first DCI and the second DCI, may be transmitted over the unlicensed carrier.

As shown in FIG. 14, at time t2, the first SL UE performs LBT (LBT1) and transmits a PSSCH (PSSCH1) to the second SL UE. The second SL UE receives the PSSCH at time t2. Additionally, at time t3, the second SL UE performs LBT (LBT2), transmits a PSSCH (PSSCH2) to the first SL UE, and transmits feedback via a PUCCH (PUCCH1). The first SL UE receives the PSSCH at time t3. The actions of the second SL UE at times t2 and t3 are based on grants and requests provided in the second DCI message. Furthermore, at time t4, the first SL UE transmits feedback via a PUCCH (PUCCH2). The actions of the first SL UE at times t2, t3, and t4 are based on grants and requests provided in the first DCI message.

In the example of FIG. 14, both a HARQ response and LBT feedback may be transmitted via the same PUCCH. As an example, the PUCCH transmission (PUCCH1) from the second UE at time t3 may include both a HARQ response corresponding to the PSSCH transmission (PSSCH1) from the first UE and the LBT feedback corresponding to the LBT (LBT2) performed by the second UE. As another example, the PUCCH transmission (PUCCH2) from the first UE at time t4 may include both a HARQ response corresponding to the PSSCH transmission (PSSCH2) from the second UE and the LBT feedback corresponding to the LBT (LBT1) performed by the first UE at time t2. The LBT (LBT1) performed at time t2 by the first SL UE may be a Type1 LBT. Additionally, the LBT (LBT2) performed at time t3 by the second SL UE may be a Type2 LBT if a PSSCH received at the second SL UE passed the CRC. The LBT at time t3 may fall back to Type1 if the CRC failed. In the absence of a licensed carrier, the LBT (LBT3) of the first SL UE at time t4 may be Type1 if the CRC failed for the PSSCH received at the second SL UE at time t3 or Type2 if the CRC passed for the PSSCH received at the second SL UE at time t3. To account for UE processing delays, the PUCCH (PUCCH1) of the second SL UE may be scheduled before the PUCCH (PUCCH2) of the first SL UE. The example of FIG. 14 may reduce CRC bits in the DCIs, reduce a number of PUCCH transmitters, and reduce Type1 LBTs.

Figure 15:
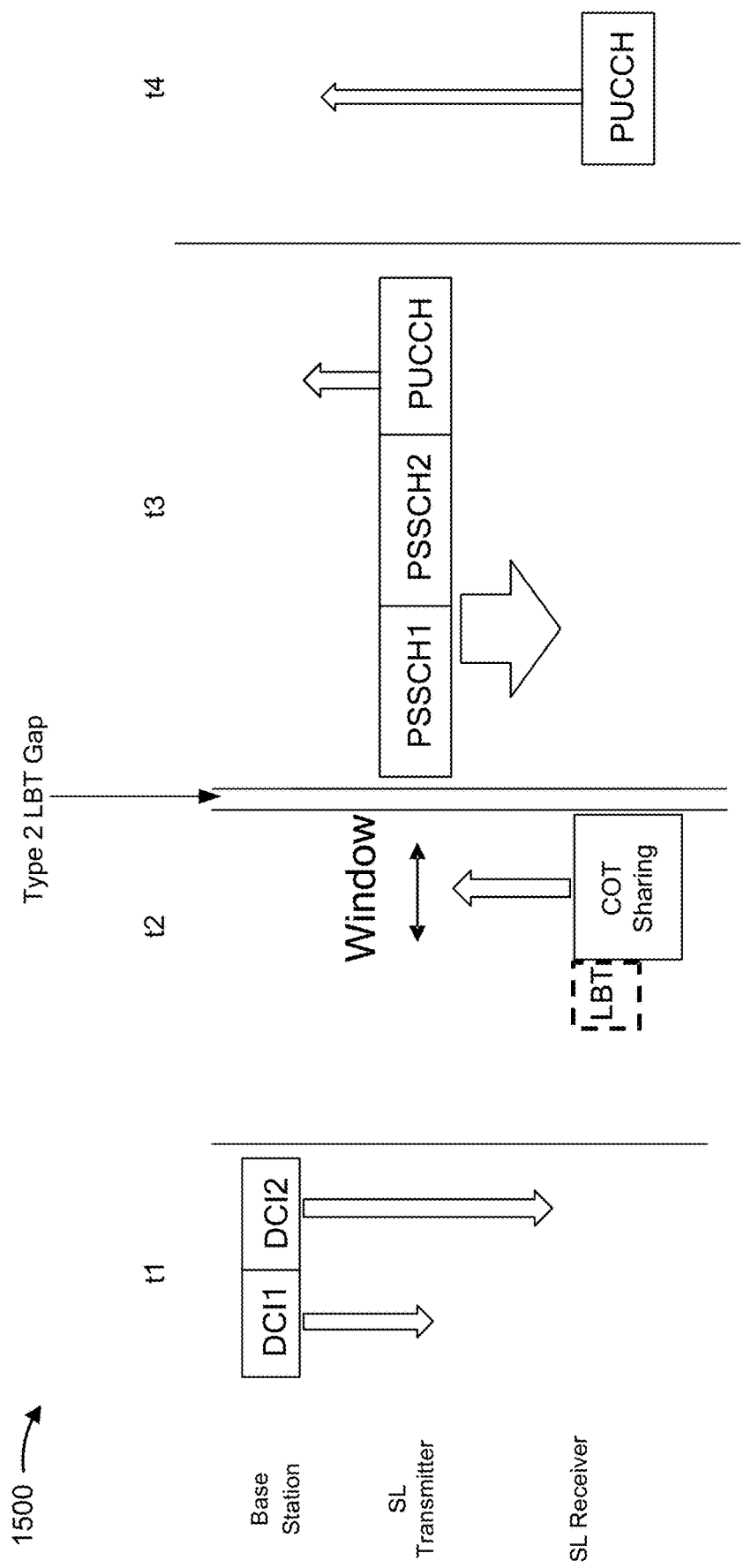
FIG. 15 is a timing diagram illustrating an example of transmitting uplink control information (UCI) sharing a channel occupancy time (COT) to an SL transmitter, in accordance with aspects of the present disclosure.

According to another aspect of the present disclosure, for robustness against LBT uncertainty, the DCI (for example, the second DCI message of FIG. 8A) transmitted to the SL receiver configures the SL receiver to conduct Type1 LBT to measure a COT and share the measured COT with the SL transmitter. FIG. 15 is a timing diagram 1500 illustrating an example of transmitting a pair of coupled DCIs from a base station to an SL transmitter and an SL receiver, in accordance with aspects of the present disclosure. In the example of FIG. 15, the base station may be an example of a base station 102, 310, 420, 421, 508, 710 described with reference to FIGS. 1, 3, 4, 5, 7, respectively, an SL transmitter may be an example of a UE 104, 350, 450, 451, 452, 502, 504, 506, 706 described with reference to FIGS. 1, 3, 4, 5, and 7, respectively, and the SL receiver may be an example of a UE 104, 350, 450, 451, 452, 502, 504, 506, 708 described with reference to FIGS. 1, 3, 4, 5, and 7, respectively. In some implementations, as shown in FIG. 15, the SL receiver may transmit UCI sharing a COT to an SL transmitter, in accordance with aspects of the present disclosure. As shown in FIG. 15, at time t1, the base station, transmits a first DCI (DCI1) to the SL transmitter, and a second DCI (DCI2) to the SL receiver. In the example of FIG. 15, each DCI, such as the first DCI and the second DCI, may be transmitted over the unlicensed carrier or licensed carrier.

As described, the second DCI message configures the SL receiver to conduct Type1 LBT and shares the COT with the SL transmitter when the type 1 LBT is successful. As shown in FIG. 15, at time t2, the SL receiver conducts the Type1 LBT. Additionally, if the Type1 LBT succeeded, the COT is obtained and an indication of COT sharing may be sent to the SL transmitter via a UCI message during the window. The second DCI message may include a Type 1 LBT configuration (such as channel access priority class (CAPC)), a cyclic prefix extension, an energy detection threshold, and the window for acquiring the COT and sharing the COT via the UCI transmitted on a PUCCH.

Additionally, the first DCI message received at the SL transmitter, at time t1, may configure the SL transmitter for the possibility of receiving the shared COT via UCI from the SL receiver. The SL transmitter can perform Type1 LBT while searching for the UCI indicating that the COT is being shared. After receiving the UCI, at time t2, the SL transmitter may perform Type2 LBT at time t3 (not shown in FIG. 15). The SL transmitter may perform the Type2 LBT after the specified Type2 LBT gap. In another implementation, as shown in FIG. 15, the SL transmitter performs Type2 LBT while searching for the UCI, indicating the COT is being shared. The SL transmitter may perform Type2 LBT after receiving the UCI. At time t3, the SL transmitter transmits one or more PSSCHs to the SL receiver and provides LBT feedback to the base station via a PUCCH. At time t4, the SL receiver provides the HARQ response to the base station via a PUCCH.

Figure 16:
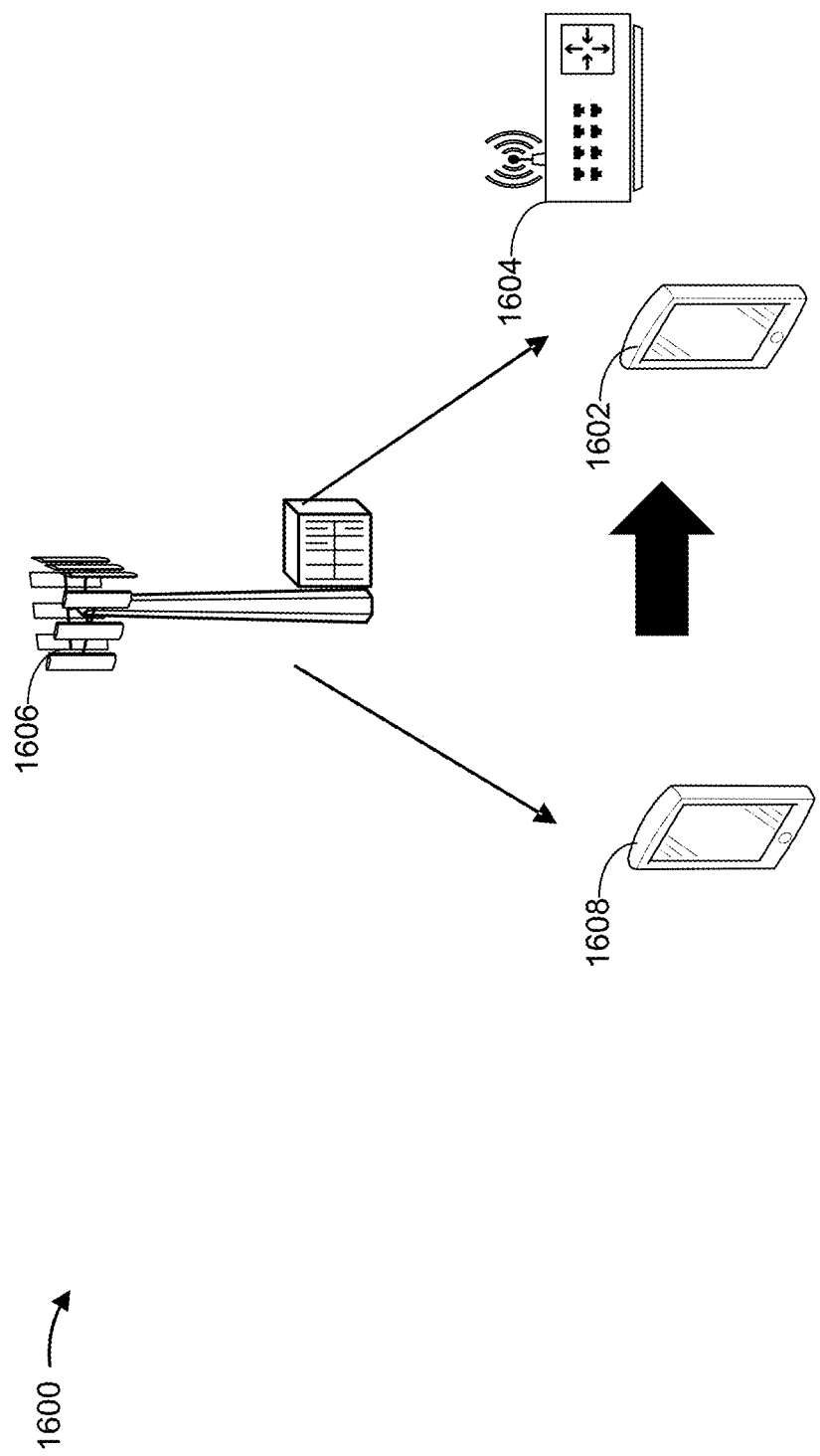
FIG. 16 is a diagram illustrating an example of a network with an SL receiver suffering from hidden node interference, in accordance with aspects of the present disclosure.

According to another aspect of the present disclosure, the coupled DCIs described above may be configured to improve reliability of sidelink transmissions to an SL receiver suffering from hidden node interference. FIG. 16 is a diagram illustrating an example of a network 1600 with an SL receiver 1602 suffering from hidden node interference, in accordance with aspects of the present disclosure. The network 1600 may correspond to a portion of the network 100 described with reference to FIG. 1. The SL receiver 1602 may be an example of a UE 104, 350, 450, 451, 452, 502, 504, 506, 708 described with reference to FIGS. 1, 3, 4, 5, and 7, respectively and an SL transmitter 1608 may be an example of a UE 104, 350, 450, 451, 452, 502, 504, 506, 706 described with reference to FIGS. 1, 3, 4, 5, and 7, respectively. A base station 1606 may be an example of a base station 102, 310, 420, 421, 508, 710 described with reference to FIGS. 1, 3, 4, 5, 7, respectively.

As shown in FIG. 16, a node 1604, such as a Wi-Fi router, may be near the SL receiver 1602. In the current example, the node 1604 may be referred to as a hidden node. In one implementation, the SL receiver 1602 determines a time for receiving data to improve reliability of the data reception. For example, the base station 1606 may transmit a DCI to the SL transmitter 1608, indicating a sidelink transmission should be triggered by a message (for example, UCI) transmitted from the SL receiver 1602. The message may include an indication that the SL receiver is sharing a COT. In one example, the SL transmitter 1608 only performs Type2 LBT while searching for UCI including a shared COT. In this example, the SL transmitter 1608 does not perform a Type1 LBT while searching for the UCI. In some implementations, the base station 1606 may transmit multiple DCIs to the SL transmitter 1608. Each DCI may correspond to a different MCS. The SL receiver 1602 may identify an appropriate COT to be shared via the UCI.

As indicated above, FIGS. 7-16 are provided as examples. Other examples may differ from what is described with respect to FIGS. 7-16.

Figure 17:
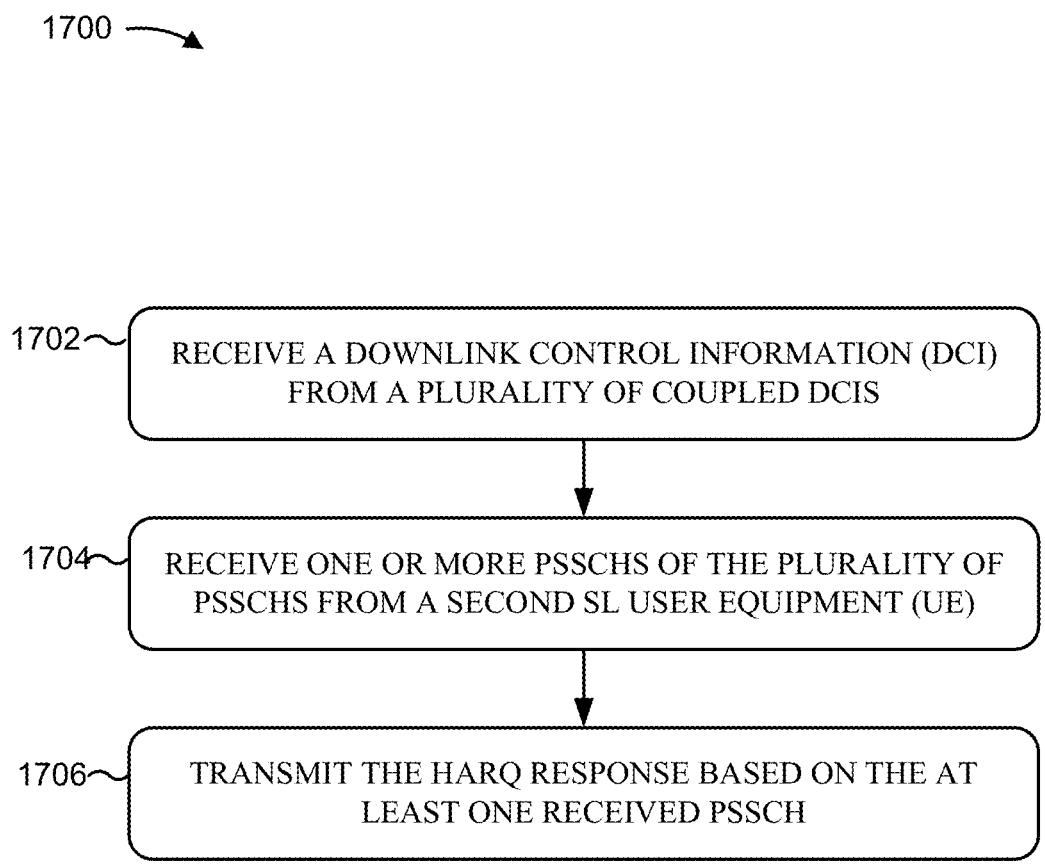
FIGS. 17 and 18 are diagrams illustrating examples of processes performed, for example, by a UE, in accordance with various aspects of the present disclosure.

FIG. 17 is a diagram illustrating an example process 1700 performed, for example, by an SL UE, in accordance with various aspects of the present disclosure. The SL UE implementing the process 1700 may be an example of a UE 104, 350, 450, 451, 452, 502, 504, 506, 708, or its components, described with reference to FIGS. 1, 3, 4, 5, and 7, respectively. The example process 1700 is an example of in-coverage network controlled off-loading over an unlicensed sidelink.

As shown in FIG. 17, in some aspects, the process 1700 may include receiving a DCI from a number of coupled DCIs (block 1702). For example, the UE (e.g., using the antenna 352, RX 354, RX processor 356, controller/processor 359, memory 360, and/or the like) can receive the DCI. In one implementation, the DCI grants reception of a number of PSSCHs over an unlicensed SL carrier. Additionally, in this implementation, the DCI requests a HARQ response for the number of scheduled PSSCHs. In some examples, the DCI includes time domain resource allocation (TDRA) for the number of PSSCHs and corresponding HARQ identifiers, new data indicators, redundancy versions, modulation coding schemes, transmission configuration indicators, and a common frequency domain resource allocation (FDRA). In such examples, the DCI also includes a physical uplink control channel (PUCCH) resource for the HARQ response. In some implementations, the DCI grants an SL transmission. The UE may transmit SL data to the second SL UE based on the SL transmission grant. Additionally, in some examples, the DCI configures the first SL UE to perform a type1 listen-before-talk (LBT) to determine a channel occupancy time (COT). In some such examples, the first SL UE shares the COT with the second SL UE.

As shown in FIG. 17, in some aspects, the process 1700 may include receiving one or more PSSCHs of the number of PSSCHs from another SL UE (block 1704). For example, the UE (e.g., using the antenna 352, RX 354, RX processor 356, controller/processor 359, memory 360, and/or the like) can receive at least one of the number of PSSCHs from the other SL UE. In some examples, the PSSCHs are transmitted without SL control information (SCI).

In some implementations, the SL UE decodes each of the scheduled PSSCHs based on the DCI grant. As shown in FIG. 17, in some aspects, the process 1700 may include transmitting the HARQ response based on the received PSSCHs (block 1706). For example, the UE (e.g., using the antenna 352, TX 354, TX processor 368, controller/processor 359, memory 360, and/or the like) can transmit the HARQ response. In some examples, a bitmap may be transmitted via the HARQ response. The bitmap may indicate a cyclic redundancy check (CRC) pass or fail for the plurality of scheduled PSSCHs. In some implementations, the DCI may be received via a licensed anchor carrier and the HARQ response may be transmitted via the licensed anchor carrier.

Figure 18:
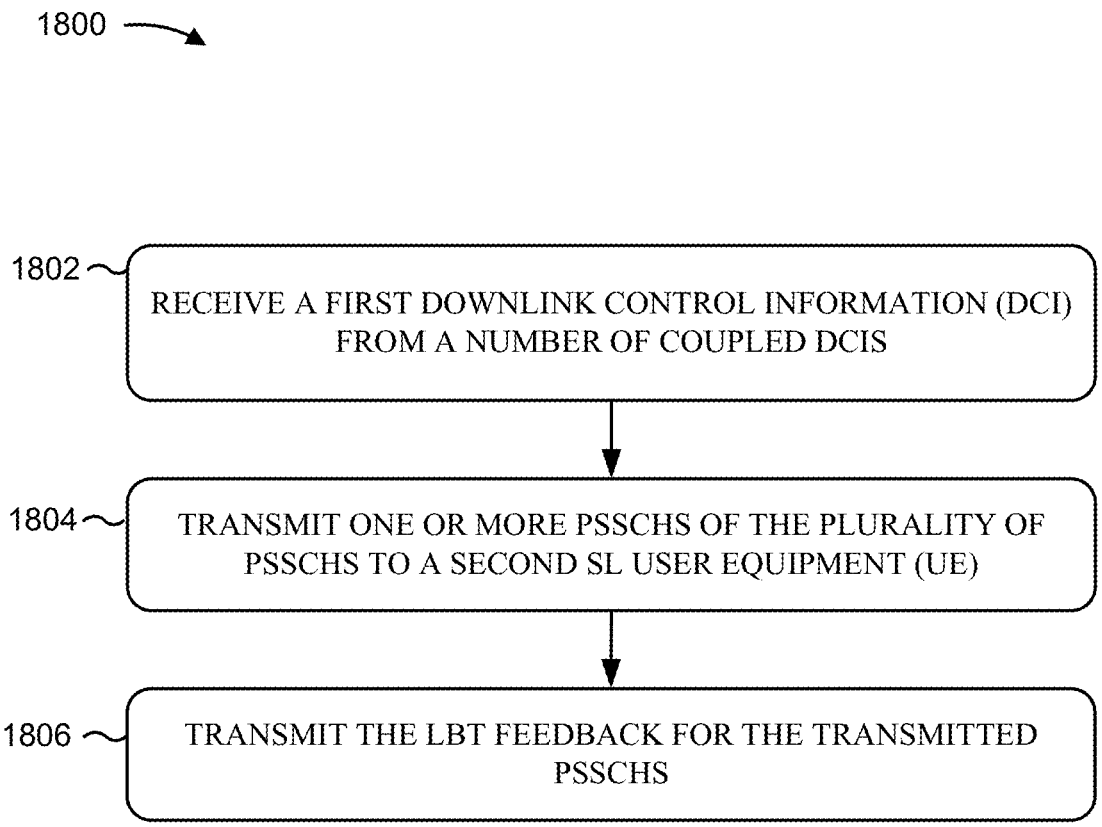

FIG. 18 is a diagram illustrating an example process 1800 performed, for example, by an SL UE, in accordance with various aspects of the present disclosure. The SL UE implementing the process 1800 may be an example of a UE 104, 350, 450, 451, 452, 502, 504, 506, 706, or its components, described with reference to FIGS. 1, 3, 4, 5, and 7, respectively. The example process 1800 is an example of in-coverage network controlled off-loading over an unlicensed sidelink.

As shown in FIG. 18, in some aspects, the process 1800 may include receiving a DCI from a number of coupled DCIs (block 1802). For example, the UE (e.g., using the antenna 352, RX 354, RX processor 356, controller/processor 359, memory 360, and/or the like) can receive the DCI. The DCI may grant transmission of a number of PSSCHs over an unlicensed SL carrier. Additionally, the DCI may configure an LBT for the number of PSSCH and request LBT feedback for the LBT.

As shown in FIG. 18, in some aspects, the process 1800 may include transmitting one or more PSSCHs of the number of PSSCHs to another SL UE (block 1804). For example, the UE (e.g., using the antenna 352, TX 354, TX processor 368, controller/processor 359, memory 360, and/or the like) can transmit at least one of the number of PSSCHs.

As shown in FIG. 18, in some aspects, the process 1800 may include transmitting the LBT feedback for the transmitted PSSCHs (block 1806). For example, the UE (e.g., using the antenna 352, TX 354, TX processor 368, controller/processor 359, memory 360, and/or the like) can transmit the LBT feedback.

Figure 19:
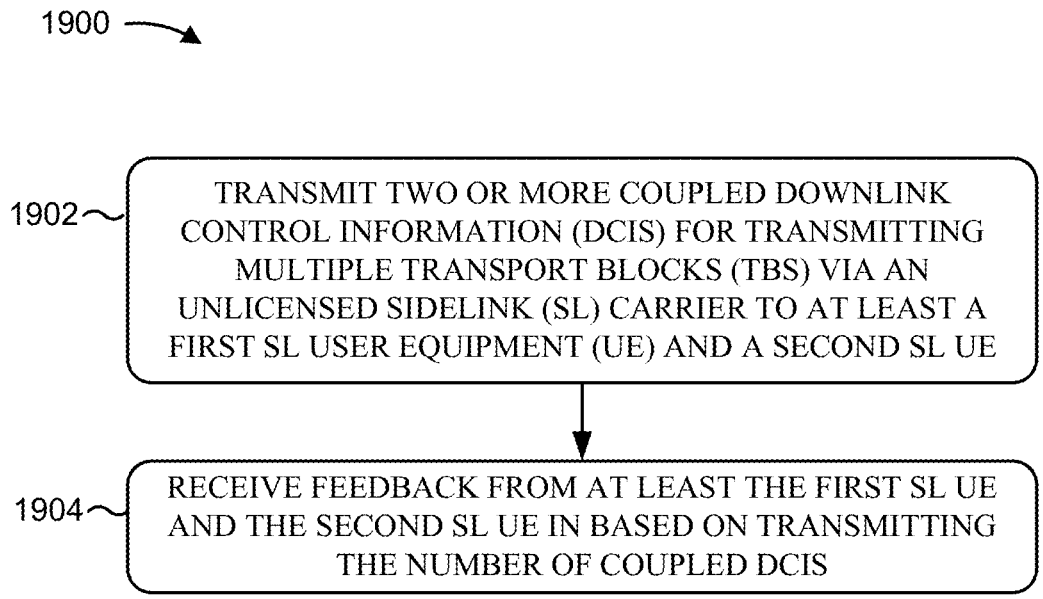
FIG. 19 is a diagram illustrating an example process performed, for example, by a base station, in accordance with various aspects of the present disclosure.

FIG. 19 is a diagram illustrating an example process 1900 performed, for example, by a base station, in accordance with various aspects of the present disclosure. The base station implementing the process 1900 may be an example of a base station 102, 310, 420, 421, 508, 710, or its components, described with reference to FIGS. 1, 3, 4, 5, 7, respectively. The example process 1900 is an example of in-coverage network controlled off-loading over an unlicensed sidelink.

As shown in FIG. 19, in some aspects, the process 1900 may include transmitting two or more coupled DCIs for transmitting multiple transport blocks (TBs) via an unlicensed SL carrier to at least a first SL UE and a second SL UE (block 1902). For example, the base station (e.g., using the antenna 320, TX 318, TX processor 316, controller/processor 375, memory 376, and/or the like) can transmit a number of coupled DCIs. In some implementations, the first SL UE is a first SL transmitter and the second SL UE is a first SL receiver. In such implementations, a first DCI of the coupled DCIs is transmitted to the first SL transmitter and a second DCI of the coupled DCIs is transmitted to the first SL receiver. In some implementations, the coupled DCIs grant a first SL transmission to the first SL UE and a second SL transmission to the second SL UE. In such implementations, the first SL and second SL transmissions may be granted over the unlicensed SL carrier.

In some implementations, the DCI grants transmission of one or more physical SL shared channels (PSSCHs) without SL control information (SCI), configures a listen-before-talk (LBT) for the PSSCHs, and requests uplink control information (UCI) indicating LBT success or failure. In some such implementations, the first DCI grants a physical uplink control channel (PUCCH) and specifies a timing of the PUCCH. The pre-coding information of the PUCCH may be different from pre-coding information for the PSSCHs. In some examples, the PUCCH may be allocated after a last PSSCH of the PSSCHs. In some implementations, the base station may receive a bitmap indicating successful transmission of one or more PSSCHs. The bitmap may be received via the PUCCH.

Additionally, in some such implementations, the second DCI requests UCI indicating storage of log-likelihood ratios (LLRs) for respective hybrid automatic repeat request (HARQ) processes. The base station may receive a bitmap indicating whether the first SL receiver stored the LLRs. In some other implementations, the second DCI grants reception for one or more PSSCHs transmitted from at least the first SL transmitter without SL control information (SCI), and the second DCI may also request a HARQ response for the PSSCHs. In such implementations, the second DCI may include time domain resource allocation (TDRA) for the PSSCHs and corresponding HARQ identifiers, new data indicators, redundancy versions, modulation coding schemes, transmission configuration indicators, and a common frequency domain resource allocation (FDRA). The second DCI may also include a grant for a PUCCH for the HARQ response. In still some other implementations, the second DCI may configure the first SL receiver to identify a COT by performing a type1 LBT, and share the COT with the first SL transmitter.

As shown in FIG. 19, in some aspects, the process 1900 may include receiving feedback from at least the first SL UE and the second SL UE based on the number of coupled DCIs (block 1904). For example, the base station (e.g., using the antenna 320, RX 318, RX processor 370, controller/processor 375, memory 376, and/or the like) can receive feedback from at least the first SL UE and the second SL UE. In some examples, the first SL UE may provide LBT feedback. The LBT feedback may include a bitmap for respective PSSCHs, where a bit value of 1 indicates a corresponding PSSCH has been transmitted (for example, LBT success), and a bit value of 0 indicates a corresponding PSSCH has not been transmitted (for example, LBT fail). As described, with reference to the example of FIG. 10, the first LBT failed and the second LBT succeeded, therefore, the bitmap (e.g., LBT feedback) transmitted via the PUCCH at time t2 is set to "01". As another example, the feedback from the second SL UE may include a HARQ response, via a PUCCH. In one example, as described with reference to FIG. 8A, the HARQ response indicates whether the PSSCHs, such as PSSCH1 and PSSCH2 of FIG. 8A, transmitted by an SL transmitter were successfully decoded.

Implementation examples are described in the following numbered clauses:

1. A method performed by a first sidelink (SL) user equipment (UE), comprising:
    receiving a downlink control information (DCI) from a plurality of coupled DCIs, the DCI:
        granting reception of a plurality of scheduled physical SL shared channels (PSSCHs) over an unlicensed SL carrier, and
        requesting a hybrid automatic repeat request (HARQ) response for the plurality of scheduled PSSCHs;
    receiving at least one of the plurality of PSSCHs from a second SL UE; and
    transmitting the HARQ response based on the at least one received PSSCH.

2. The method of clause 1, in which the plurality of PSSCHs are transmitted without SL control information (SCI).

3. The method of any of clauses 1-2, in which the DCI comprises:
    time domain resource allocation (TDRA) for the plurality of PSSCHs and corresponding HARQ identifiers, new data indicators, redundancy versions, modulation coding schemes, transmission configuration indicators, and a common frequency domain resource allocation (FDRA); and
    a physical uplink control channel (PUCCH) resource for the HARQ response.

4. The method of any of clauses 1-3, further comprising:
    decoding each of the plurality of scheduled PSSCHs based on a grant of the DCI; and
    transmitting, via the HARQ response, a bitmap indicating a cyclic redundancy check (CRC) pass or fail for the plurality of scheduled PSSCHs.

5. The method of any of clauses 1-4, further comprising combining log-likelihood ratios (LLRs) based on demodulated reference signal (DMRS) sequences.

6. The method of clause 5, further comprising applying a first detection threshold for a first PSSCH of the plurality of scheduled PSSCHs and a second detection threshold for a PSSCH scheduled subsequent to the first PSSCH, in which the first detection threshold is greater than the second detection threshold.

7. The method of clause 5, further comprising transmitting a message indicating storage of the combined LLRs; and.

8. The method of clause 7, further comprising receiving a request to flush a HARQ buffer when the transmitted message is indicative of an incorrect HARQ management.

9. The method of any of clauses 1-8, further comprising:
    receiving the DCI via a licensed anchor carrier; and
    transmitting the HARQ response via the licensed anchor carrier.

10. The method of any of clauses 1-9, further comprising receiving a listen-before-talk (LBT) configuration for a physical uplink control channel (PUCCH) resource when a licensed carrier is unavailable, in which a type1 LBT is configured for the HARQ response and soft buffer, a type2

LBT is configured for a delayed uplink control information (UCI) when a cyclic redundancy check passes for a PSSCH received in a slot corresponding to the PUCCH resource for the HARQ response, and the DCI comprises a field for the delayed UCI when the first SL UE is configured for the type2 LBT.

11. The method of any of clauses 1-10, in which the DCI grants an SL transmission, and further comprising transmitting SL data to the second SL UE based on the SL transmission grant.

12. The method of any of clauses 1-11, in which the DCI configures the first SL UE to perform a type1 listen-before-talk (LBT) to determine a channel occupancy time (COT), and further comprising transmitting an indication that the COT is being shared to the second SL UE.

13. A method performed by a base station, comprising:
transmitting a plurality of coupled downlink control information (DCIs) for transmitting multiple transport blocks (TBs) via an unlicensed sidelink (SL) carrier to at least a first SL user equipment (UE) and a second SL UE; and
receiving feedback from at least the first SL UE and the second SL UE based on the plurality of coupled DCIs.

14. The method of clause 13, in which:
the first SL UE is a first SL transmitter and the second SL UE is a first SL receiver; and
a first DCI of the plurality of coupled DCIs is transmitted to the first SL transmitter and a second DCI of the plurality of coupled DCIs transmitted to the first SL receiver.

15. The method of clause 14, in which the first DCI:
grants transmission of a plurality of physical SL shared channels (PSSCHs) without SL control information (SCI);
configures a listen-before-talk (LBT) for the plurality of PSSCHs; and
requests uplink control information (UCI) indicating LBT success or failure.

16. The method of any of clauses 14-15, in which the first DCI grants a physical uplink control channel (PUCCH) and specifies a timing of the PUCCH.

17. The method of clause 16, in which pre-coding information of the PUCCH is different from pre-coding information for the plurality of PSSCHs.

18. The method of any of clauses 16-17, in which the PUCCH is allocated after a last PSSCH of the plurality of PSSCHs.

19. The method of any of clauses 16-18, further comprising receiving, via the PUCCH, a bitmap indicating successful transmission of at least one PSSCH from the plurality of PSSCHs.

20. The method of clause 14, in which the second DCI requests uplink control information (UCI) indicating storage of log-likelihood ratios (LLRs) for respective hybrid automatic repeat request (HARQ) processes, and further comprising receiving a bitmap indicating whether the first SL receiver stored the LLRs.

21. The method of clause 20, further comprising:
determining whether HARQ soft-information management of the first SL receiver is correct based on the received bitmap and a PUCCH resource of the first SL transmitter; and
flushing a HARQ buffer of the first SL receiver at a subsequent scheduling when the HARQ soft-information management is incorrect.

22. The method of clause 14, in which the second DCI:
grants reception for a plurality of physical SL shared channels (PSSCHs) transmitted from at least the first SL transmitter without SL control information (SCI); and
requests a hybrid automatic repeat request (HARQ) response for the plurality of PSSCHs.

23. The method of clause 22, in which the second DCI comprises:
time domain resource allocation (TDRA) for the plurality of PSSCHs and corresponding HARQ identifiers, new data indicators, redundancy versions, modulation coding schemes, transmission configuration indicators, and a common frequency domain resource allocation (FDRA); and
a grant for a physical uplink control channel (PUCCH) for the HARQ response.

24. The method of any of clauses 13-23, further comprising:
configuring listen-before-talk (LBT) for each physical uplink control channel (PUCCH) when a licensed carrier is not available; and
configuring the first SL transmitter to transmit a PUCCH without LBT when the PUCCH is scheduled within a same channel occupancy time (COT) as a physical SL shared channel (PSSCH).

25. The method of any of clauses 14-23, further comprising configuring the first SL receiver for:
type1 listen-before-talk (LBT) for a hybrid automatic repeat request (HARD) response and soft buffer; or
type2 LBT for a delayed uplink control information (UCI) when a cyclic redundancy check passes for a physical SL shared channel (PSSCH) received in a slot corresponding to a physical uplink control channel (PUCCH) resource, the second DCI comprising a field for the delayed UCI when the first SL receiver is configured for the type2 LBT.

26. The method of any of clauses 14-23, in which the second DCI configures the first SL receiver to identify a channel occupancy time (COT) by performing a type1 LBT, and share the COT with the first SL transmitter.

27. The method of any of clauses 13-26, in which:
the plurality of coupled DCIs grant a first SL transmission to the first SL UE and a second SL transmission to the second SL UE; and
the first SL transmission and the second SL transmission are granted over the unlicensed SL carrier.

28. The method of any of clauses 13-27, further comprising:
transmitting the plurality of coupled DCIs over a licensed anchor carrier; and
receiving the feedback over the licensed anchor carrier.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described and in Appendix A may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed:

1. A method performed by a first sidelink (SL) user equipment (UE), comprising:
   receiving downlink control information (DCI) from a plurality of coupled DCIs, the DCI includes:
      a grant of one or more resources for receiving one or more SL data transmissions via a plurality of scheduled physical SL shared channels (PSSCHs) over an unlicensed SL carrier, and
      a request for a hybrid automatic repeat request (HARQ) response for the one or more SL data transmissions;
   receiving, from a second SL UE, first SL data via at least one of the plurality of PSSCHs in accordance with receiving the DCI;
   decoding the first SL data based on the grant of the DCI; and
   transmitting the HARQ response based on receiving the first SL data, the HARQ response including a bitmap indicating a cyclic redundancy check (CRC) pass or fail in accordance with decoding the first SL data.

2. The method of claim 1, in which the plurality of PSSCHs are transmitted without SL control information (SCI).

3. The method of claim 1, in which the DCI indicates:
   a time domain resource allocation (TDRA) for the one or more resources and corresponding HARQ identifiers, new data indicators, redundancy versions, modulation coding schemes, transmission configuration indicators, and a common frequency domain resource allocation (FDRA); and
   a grant for a physical uplink control channel (PUCCH) resource for the HARQ response.

4. The method of claim 1, further comprising combining log-likelihood ratios (LLRs) based on demodulation reference signal (DMRS) sequences.

5. The method of claim 4, further comprising applying a first detection threshold for a first PSSCH of the plurality of scheduled PSSCHs and a second detection threshold for a PSSCH scheduled subsequent to the first PSSCH, in which the first detection threshold is greater than the second detection threshold.

6. The method of claim 4, further comprising transmitting a message indicating storage of the combined LLRs.

7. The method of claim 6, further comprising receiving a request to flush a HARQ buffer when the message is indicative of an incorrect HARQ management.

8. The method of claim 1, further comprising:
   receiving the DCI via a licensed anchor carrier; and
   transmitting the HARQ response via the licensed anchor carrier.

9. The method of claim 1, further comprising receiving a listen-before-talk (LBT) configuration for a physical uplink control channel (PUCCH) resource when a licensed carrier is unavailable, in which a type1 LBT is configured for the HARQ response and soft buffer, a type2 LBT is configured for a delayed uplink control information (UCI) when a cyclic redundancy check passes for a PSSCH received in a slot corresponding to the PUCCH resource for the HARQ response, and the DCI comprises a field for the delayed UCI when the first SL UE is configured for the type2 LBT.

10. The method of claim 1, in which the DCI grants resources for an SL transmission, and further comprising transmitting second SL data to the second SL UE based on the resources for the SL transmission.

11. The method of claim 1, in which the DCI configures the first SL UE to perform a type1 listen-before-talk (LBT) to determine a channel occupancy time (COT), and further comprising transmitting an indication that the COT is being shared to the second SL UE.

12. An apparatus for wireless communications at a first sidelink (SL) user equipment (UE), comprising:
   one or more processors;
   one or more memories coupled with the one or more processors; and
   instructions stored in the one or more memories and operable, when executed by the one or more processors individually or collectively, to cause the apparatus to:
      receive downlink control information (DCI) from a plurality of coupled DCIs, the DCI indicating:
         a grant of one or more resources for receiving one or more SL data transmissions via a plurality of scheduled physical SL shared channels (PSSCHs) over an unlicensed SL carrier, and
         a request for a hybrid automatic repeat request (HARQ) response for the one or more SL data transmissions;
      receive, from a second SL UE, SL data via at least one of the plurality of PSSCHs in accordance with receiving the DCI;
      decode the SL data based on the grant of the DCI; and transmit the HARQ response based on receiving the SL data, the HARQ response including a bitmap indicating a cyclic redundancy check (CRC) pass or fail in accordance with decoding the SL data.

13. A method performed by a base station, comprising:
transmitting, to a plurality of sidelink (SL) user equipment (UEs) including at least a first SL UE and a second SL UE, a plurality of coupled downlink control information (DCIs) including at least a first DCI and a second DCI for transmitting multiple transport blocks (TBs) via an unlicensed SL carrier, the second DCI requests uplink control information (UCI) indicating whether or not log-likelihood ratios (LLRs) for respective hybrid automatic repeat request (HARQ) processes are stored at the second SL UE; and
receiving feedback from at least the first SL UE and the second SL UE based on the plurality of coupled DCIs.

14. The method of claim 13, in which:
the first SL UE is a first SL transmitter and the second SL UE is a first SL receiver; and
the first DCI of the plurality of coupled DCIs is transmitted to the first SL transmitter and the second DCI of the plurality of coupled DCIs is transmitted to the first SL receiver.

15. The method of claim 14, in which the first DCI further indicates:
a second grant of one or more resources for transmitting one or more messages via a plurality of physical SL shared channels (PSSCHs) without SL control information (SCI);
a configuration of a listen-before-talk (LBT) for the plurality of PSSCHs; and
a second request for UCI indicating LBT success or failure.

16. The method of claim 15, in which the first DCI grants the one or more resources for transmitting the one or more messages via a physical uplink control channel (PUCCH) and specifies a timing of the PUCCH.

17. The method of claim 16, in which pre-coding information of the PUCCH is different from pre-coding information for the plurality of PSSCHs.

18. The method of claim 17, in which the PUCCH is allocated after a last PSSCH of the plurality of PSSCHs.

19. The method of claim 16, further comprising receiving, via the PUCCH, a bitmap indicating successful transmission of at least one PSSCH from the plurality of PSSCHs.

20. The method of claim 14, further comprising receiving a bitmap indicating whether the first SL receiver stored the LLRs.

21. The method of claim 20, further comprising:
determining whether HARQ soft-information management of the first SL receiver is correct based on the received bitmap and a PUCCH resource of the first SL transmitter; and
flushing a HARQ buffer of the first SL receiver at a subsequent scheduling when the HARQ soft-information management is incorrect.

22. The method of claim 14, in which the second DCI indicates:
a third grant of one or more resources for receiving one or more messages via a plurality of physical SL shared channels (PSSCHs) transmitted from at least the first SL transmitter without SL control information (SCI); and
a third request of a HARQ response for the one or more messages.

23. The method of claim 22, in which the second DCI indicates:
a time domain resource allocation (TDRA) for the one or more messages and corresponding HARQ identifiers, new data indicators, redundancy versions, modulation coding schemes, transmission configuration indicators, and a common frequency domain resource allocation (FDRA); and
a grant for a physical uplink control channel (PUCCH) for the HARQ response.

24. The method of claim 14, further comprising:
configuring listen-before-talk (LBT) for each physical uplink control channel (PUCCH) when a licensed carrier is not available; and
configuring the first SL transmitter to transmit a PUCCH without LBT when the PUCCH is scheduled within a same channel occupancy time (COT) as a physical SL shared channel (PSSCH).

25. The method of claim 14, further comprising configuring the first SL receiver for:
type1 listen-before-talk (LBT) for a hybrid automatic repeat request (HARQ) response and soft buffer; or
type2 LBT for a delayed uplink control information (UCI) when a cyclic redundancy check passes for a physical SL shared channel (PSSCH) received in a slot corresponding to a physical uplink control channel (PUCCH) resource, the second DCI comprising a field for the delayed UCI when the first SL receiver is configured for the type2 LBT.

26. The method of claim 14, in which the second DCI configures the first SL receiver to:
identify a channel occupancy time (COT) by performing a type1 LBT, and
share the COT with the first SL transmitter.

27. The method of claim 13, in which:
the plurality of coupled DCIs grant one or more resources for a first SL transmission to the first SL UE and a second SL transmission to the second SL UE; and
the first SL transmission and the second SL transmission are granted over the unlicensed SL carrier.

28. The method of claim 13, further comprising:
transmitting the plurality of coupled DCIs over a licensed anchor carrier; and
receiving the feedback over the licensed anchor carrier.

29. An apparatus for wireless communications at a base station, comprising:
one or more processors;
one or more memories coupled with the one or more processors; and
instructions stored in the one or more memories and operable, when executed by the one or more processors, individually or collectively, to cause the apparatus to:
transmit, to a plurality of sidelink (SL) user equipment (UEs) including at least a first SL UE and a second SL UE, a plurality of coupled downlink control information (DCIs) including at least a first DCI and a second DCI for transmitting multiple transport blocks (TBs) via an unlicensed SL carrier, the second DCI requests uplink control information (UCI) indicating whether or not log-likelihood ratios (LLRs) for respective hybrid automatic repeat request (HARQ) processes are stored at the second SL UE; and receive feedback from at least the first SL UE and the second SL UE in response to transmitting the plurality of coupled DCIs.

\* \* \* \* \*